US012687469B2

(12) United States Patent
Weng et al.

(10) Patent No.: US 12,687,469 B2
(45) Date of Patent: Jul. 21, 2026

(54) SMEAR PREPARATION MACHINE AND CONTROL METHOD THEREFOR

(71) Applicant: Shenzhen Mindray Bio-Medical Electronics Co., Ltd., Shenzhen (CN)

(72) Inventors: Shaokui Weng, Shenzhen (CN); Jieshan He, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 1248 days.

(21) Appl. No.: 17/556,916

(22) Filed: Dec. 20, 2021

(65) Prior Publication Data

US 2022/0146381 A1 May 12, 2022

Related U.S. Application Data

(63) Continuation of application No. PCT/CN2019/093269, filed on Jun. 27, 2019.

(51) Int. Cl.
*G01N 1/28* (2006.01)
*G01N 1/31* (2006.01)

(52) U.S. Cl.
CPC ........... *G01N 1/2813* (2013.01); *G01N 1/312* (2013.01)

(58) Field of Classification Search
CPC .............................. G01N 1/2813; G01N 1/312
See application file for complete search history.

(56) References Cited

U.S. PATENT DOCUMENTS 3,762,362 A 10/1973 Lipshaw
6,110,425 A 8/2000 Gao

2004/0033166 A1 2/2004 Arnowitz et al.
2006/0177344 A1 8/2006 Ouchi et al.
2007/0128073 A1* 6/2007 Tappen .................. G01N 1/312
422/65
2013/0017535 A1 1/2013 Frey et al.
2013/0203072 A1 8/2013 Tian et al.
(Continued)

FOREIGN PATENT DOCUMENTS

CN 201225970 Y 4/2009
CN 201255707 Y 6/2009
(Continued)

*Primary Examiner* — Jonathan M Hurst

(74) *Attorney, Agent, or Firm* — Syncoda LLC; Feng Ma

(57) ABSTRACT

Smear preparation machine and control method therefor. The smear preparation machine includes a slide loading mechanism for loading slide, a sample applying mechanism for applying blood sample, a slide smearing mechanism for smearing blood sample to prepare smear slide, a staining mechanism and a slide transferring mechanism. The staining mechanism includes a reagent vessel for storing staining reagent and a first driving system for driving the reagent vessel to reciprocally translate in first direction. The slide transferring mechanism includes a manipulator and a second driving system for driving the manipulator to reciprocally translate in second direction. After reagent vessel and manipulator respectively translate to corresponding cooperative positions, the second driving system drives manipulator to move towards reagent vessel to place or remove smear slide in reagent vessel. Staining of smear slide is achieved by cooperation movement of manipulator and reagent vessel, thereby simplifying internal structure of smear preparation machine.

18 Claims, 8 Drawing Sheets

(56)  References Cited

U.S. PATENT DOCUMENTS

| | | |
|---|---|---|
| 2015/0323776 A1 | 11/2015 | Dyson-Holland et al. |
| 2017/0176481 A1 | 6/2017 | Accurso et al. |
| 2017/0261412 A1 | 9/2017 | Kubota et al. |

FOREIGN PATENT DOCUMENTS

| | | |
|---|---|---|
| CN | 102053031 A | 5/2011 |
| CN | 102980793 A | 3/2013 |
| CN | 103364237 A | 10/2013 |
| CN | 103364242 A | 10/2013 |
| CN | 203798652 U | 8/2014 |
| CN | 105021443 A | 11/2015 |
| CN | 105092342 A | 11/2015 |
| CN | 105092344 A | 11/2015 |
| CN | 205449607 U | 8/2016 |
| CN | 106323712 A | 1/2017 |
| CN | 106442033 A | 2/2017 |
| CN | 206945405 U | 1/2018 |
| CN | 107796673 A | 3/2018 |
| CN | 108088726 A | 5/2018 |
| CN | 109374386 A | 2/2019 |
| CN | 109443889 A | 3/2019 |
| CN | 109443891 A | 3/2019 |
| CN | 109490035 A | 3/2019 |
| CN | 109520805 A | 3/2019 |
| CN | 109612798 A | 4/2019 |
| CN | 109612799 A | 4/2019 |
| IN | 103575919 A | 2/2014 |
| JP | 2000028505 A | 1/2000 |
| JP | 2002267942 A | 9/2002 |
| JP | 3620013 B2 | 2/2005 |
| JP | 2007147399 A | 6/2007 |
| WO | WO 2013152699 A1 | 10/2013 |
| WO | 2015165019 A1 | 11/2015 |

* cited by examiner

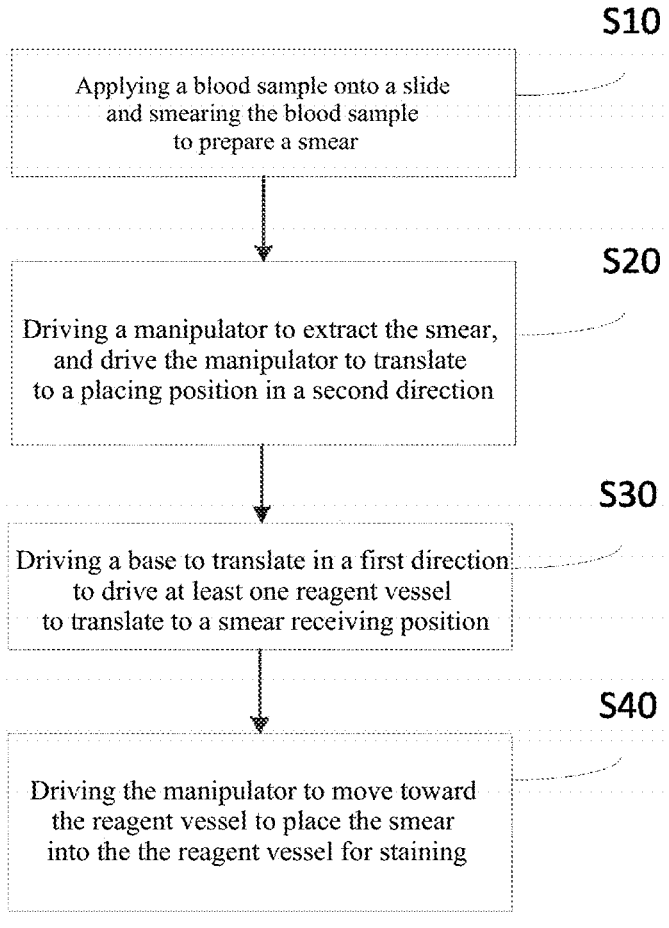

S10

Applying a blood sample onto a slide
and smearing the blood sample
to prepare a smear

S20

Driving a manipulator to extract the smear,
and drive the manipulator to translate
to a placing position in a second direction

S30

Driving a base to translate in a first direction
to drive at least one reagent vessel
to translate to a smear receiving position

S40

Driving the manipulator to move toward
the reagent vessel to place the smear
into the the reagent vessel for staining

*FIG. 11*

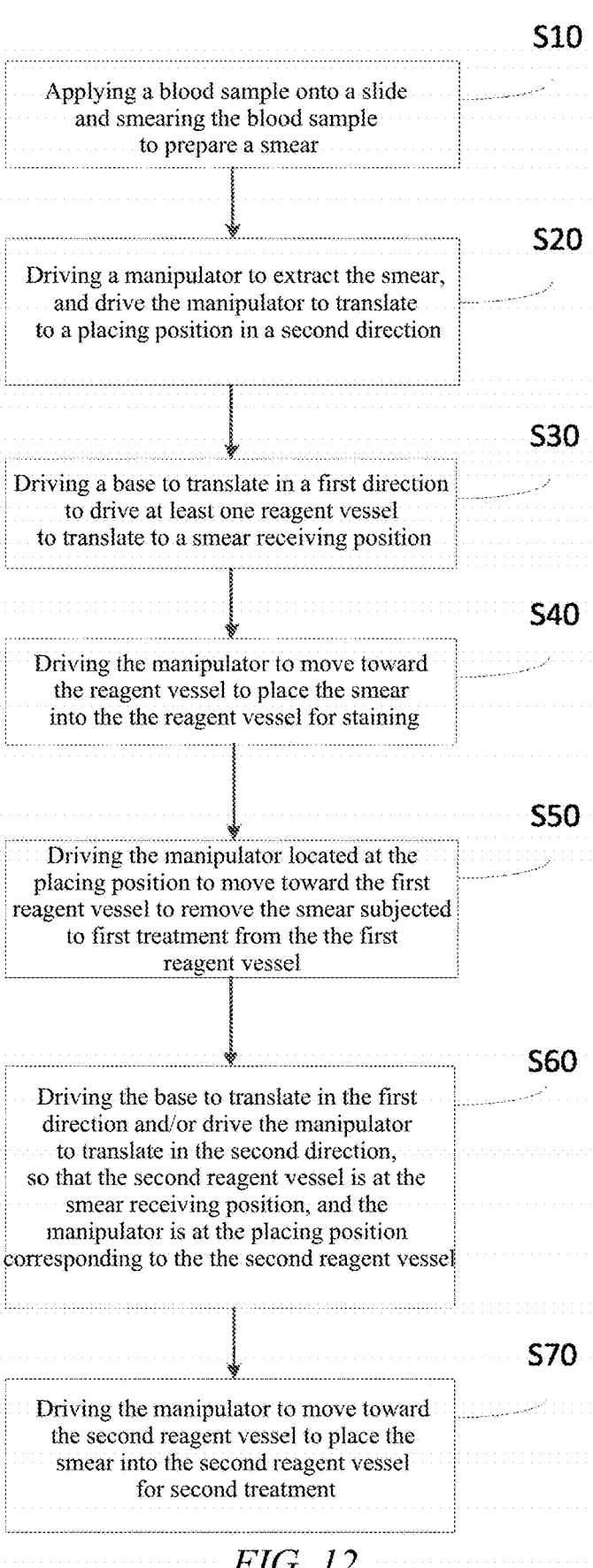

S10
Applying a blood sample onto a slide
and smearing the blood sample
to prepare a smear S20
Driving a manipulator to extract the smear,
and drive the manipulator to translate
to a placing position in a second direction S30
Driving a base to translate in a first direction
to drive at least one reagent vessel
to translate to a smear receiving position S40
Driving the manipulator to move toward
the reagent vessel to place the smear
into the the reagent vessel for staining S50
Driving the manipulator located at the
placing position to move toward the first
reagent vessel to remove the smear subjected
to first treatment from the the first
reagent vessel S60
Driving the base to translate in the first
direction and/or drive the manipulator
to translate in the second direction,
so that the second reagent vessel is at the
smear receiving position, and the
manipulator is at the placing position
corresponding to the the second reagent vessel S70
Driving the manipulator to move toward
the second reagent vessel to place the
smear into the second reagent vessel
for second treatment

Driving the base to perform reciprocating translation
in the first direction to uniformly mix
the staining reagent in the reagent vessel

S32

Driving the base in the first direction
to translate the reagent vessel
after the uniform mixing
to the smear receiving position

SMEAR PREPARATION MACHINE AND CONTROL METHOD THEREFOR

CROSS-REFERENCE TO RELATED APPLICATIONS

This application is a continuation of International Application No. PCT/CN2019/093269, filed Jun. 27, 2019, the content of which is incorporated herein by reference.

TECHNICAL FIELD

The present disclosure relates to the technical field of medical devices, and in particular, to a smear preparation machine and a control method therefor.

BACKGROUND

In a conventional method of manually staining a blood smear, a certain amount of stain is applied dropwise to a blood smear, a certain amount of buffer solution is then applied dropwise, and the stain is then uniformly mixed with the buffer solution using an ear-washing bulb or other air-blowing apparatuses; and after waiting for a period of time, the mixed liquid is washed away with running water, and the smear is dried so as to obtain a blood smear for microscopic examination, wherein leucocytes, erythrocytes, platelets, etc. are stained with specific colors for identification.

For an automatic smear preparation machine that uses an immersion staining method, a manipulator is usually used to implement motions in all spatial degrees of freedom of slide operations. The method of using the manipulator alone to implement all the motions easily affects operating efficiency. To improve efficiency, some machines use two or more manipulators for operation, which greatly increases the complexity and production costs of the machines. In addition, in internal layout of the smear preparation machine, it is needed to make space for the manipulator's motion in each degree of freedom and operation space for coupling of all degrees of freedom, which accounts for a larger proportion and is not conducive to the size control of the smear preparation machine. Further, the motions in multi degrees of freedom of the manipulator are coupled, which has high requirements for operation accuracy, and the process is difficult to achieve.

SUMMARY

The disclosure proposes a smear preparation machine with a movable manipulator and a movable reagent vessel, such that an internal structure of the smear preparation machine is simplified through cooperative movement of the manipulator and the reagent vessel. The disclosure specifically includes the following technical solutions.

In a first aspect, the disclosure proposes a smear preparation machine, comprising:

a slide loading mechanism configured to load a slide;

a sample applying mechanism configured to apply a blood sample onto the slide;

a slide smearing mechanism, configured to smear the blood sample on the slide to prepare a smear;

a staining mechanism, comprising at least one reagent vessel and a first driving system, wherein the reagent vessel is configured to store a staining reagent and has an opening at its top, and the first driving system is configured to drive the reagent vessel to perform reciprocating translation in a first direction; and a smear transferring mechanism, comprising a manipulator and a second driving system, wherein the manipulator is configured to extract the smear and place the smear into the reagent vessel for staining, the second driving system is configured to drive the manipulator to perform reciprocating translation in a second direction, and the second direction is different from the first direction;

wherein the second driving system is further configured to drive the manipulator to move toward the reagent vessel to place the smear through the opening into the reagent vessel for staining or remove the smear from the reagent vessel, after the first driving system and the second driving system respectively drive the reagent vessel and the manipulator to translate to corresponding cooperative positions.

In an embodiment, the staining mechanism is provided with a smear receiving position and a storage position corresponding to the reagent vessel, wherein the smear receiving position corresponds to the cooperative positions of the reagent vessel and the manipulator, the first driving system is further configured to drive the reagent vessel to move between the storage position and the smear receiving position, and the manipulator is further configured to place the smear into the reagent vessel located at the smear receiving position, or remove the smear from the reagent vessel located at the smear receiving position.

In an embodiment, the first driving system is further configured to drive the reagent vessel to perform reciprocating translation in a first horizontal plane to move between the storage position and the smear receiving position.

In an embodiment, the first driving system is further configured to drive the reagent vessel to perform reciprocating translation in the first direction so as to uniformly mix the staining reagent in the reagent vessel, and then drive the reagent vessel to move to the smear receiving position.

In an embodiment, above the first horizontal plane, the smear preparation machine has an accommodating space corresponding to a region from the storage position to the smear receiving position.

In an embodiment, a projection of the second direction on the first horizontal plane is at a first included angle with the first direction, and the first included angle is 90°.

In an embodiment, the staining mechanism further comprises a base connected between the reagent vessel and the first driving system, the at least one reagent vessel comprises a plurality of reagent vessels, the staining mechanism is provided with at least one smear receiving position corresponding to each reagent vessel, and the manipulator is further configured to place or remove a smear into or from each reagent vessel at the smear receiving position corresponding to said reagent vessel.

In an embodiment, the plurality of reagent vessels are sequentially arranged on the base in the first direction or the second direction.

In an embodiment, the base is rectangular, long sides of the rectangle are arranged in the first direction, and short sides are arranged in the second direction.

In an embodiment, each reagent vessel comprises at least one placing component, and each placing component is configured to provide an insertion area into which a smear is inserted, so that the smear is capable of being immersed in the staining reagent stored in the reagent vessel when the smear is inserted into the insertion area, to perform corresponding treatment.

In an embodiment, each reagent vessel comprises a plurality of placing components, so that a plurality of insertion areas are provided in the reagent vessel, and when the plurality of reagent vessels are arranged on the base in the first direction, the plurality of placing components in each reagent vessel are arranged in the second direction; and when the plurality of reagent vessels are arranged on the base in the second direction, the plurality of placing components in each reagent vessel are arranged in the first direction.

In an embodiment, the staining mechanism is provided with a fixed cover plate, and when the first driving system drives the reagent vessel to be located at the storage position, the cover plate is configured to cover the opening of the kit.

In an embodiment, a moving path of the manipulator is provided with a smear taking position and a placing position corresponding to the manipulator, the placing position corresponds to the cooperative positions of the reagent vessel and the manipulator, the second driving system comprises a first driving device for driving the manipulator to move between the smear taking position and the placing position, and the manipulator is further configured to extract the smear at the smear taking position, and to place the smear into the reagent vessel or remove the smear from the reagent vessel at the placing position.

In an embodiment, the second driving system further comprises a second driving device, which is configured to drive the manipulator at the placing position to move toward the reagent vessel, so as to place the smear in the reagent vessel or remove the smear from the kit.

In an embodiment, the first driving device is further configured to drive the manipulator to translate in a second horizontal plane to move between the smear taking position and the placing position, and the second driving device is further configured to drive the manipulator to perform reciprocating translation in a vertical direction so as to place the smear into the reagent vessel or remove the smear from the reagent vessel.

In an embodiment, the at least one reagent vessel comprises a primary staining vessel and an isolation vessel, the primary staining vessel is configured to store a first staining liquid for primary staining of the smear, the first staining liquid is a mixture of a first biological dye and a second biological dye, the first biological dye is capable of staining acidophilic substances in the blood sample, and the second biological dye is capable of staining alkalophilic substances in the blood sample; and the isolation vessel is configured to store a reagent for treating the blood sample after the primary staining and before a secondary staining.

In an embodiment, the at least one reagent vessel further comprises a secondary staining vessel, which is configured to store a second staining liquid for the secondary staining of the smear, the second staining liquid is a mixture of a third biological dye and a buffer solution, and the third biological dye is capable of staining acidophilic substances or alkalophilic substances in the blood sample.

In an embodiment, the staining mechanism further comprises a first staining liquid recovery system, a first staining liquid inlet system, and a first staining liquid sealed container, wherein the first staining liquid recovery system is respectively in fluid communication with the first staining liquid sealed container and the primary staining vessel, so as to recover the corresponding first staining liquid in the primary staining vessel into the first staining liquid sealed container; and the first staining liquid inlet system is respectively in fluid communication with the first staining liquid sealed container and the primary staining vessel, so as to discharge the first staining liquid in the first staining liquid sealed container into the primary staining vessel.

In an embodiment, when there is no smear to be stained in the primary staining vessel or a first staining liquid recovery instruction given by a user is received, the first staining liquid recovery system recovers the corresponding first staining liquid in the primary staining vessel into the first staining liquid sealed container; and when there is a smear to be stained in the primary staining vessel or a first staining liquid inlet instruction issued by the user is received, the first staining liquid inlet system discharges the first staining liquid in the first staining liquid sealed container into the primary staining vessel.

In an embodiment, the staining mechanism further comprises a first staining liquid discharge system, which is in fluid communication with the primary staining vessel or the first staining liquid sealed container, and when the first staining liquid meets discharge requirements or a first staining liquid discharge instruction issued by the user is received, the first staining liquid discharge system discharges the first staining liquid in the primary staining vessel or the first staining liquid sealed container.

In an embodiment, the isolation vessel comprises a staining improving vessel for storing a buffer solution, and the staining improving vessel is configured to buffer and clean the smear subjected to the primary staining.

In an embodiment, the isolation vessel further comprises a first cleaning vessel for storing a cleaning solution or a buffer solution, and the first cleaning vessel is configured to clean the smear subjected to the primary staining and/or the treatment by the staining improving vessel.

In an embodiment, the at least one reagent vessel further comprises a second cleaning vessel for storing a cleaning solution or a buffer solution, and the second cleaning vessel is configured to clean the smear subjected to the secondary staining.

In an embodiment, the primary staining vessel, the staining improving vessel, the first cleaning vessel, the secondary staining vessel and the second cleaning vessel are sequentially arranged on the base in the first direction or the second direction.

Another aspect of the disclosure further proposes a smear preparation machine, comprising:

a slide loading mechanism configured to load a slide;

a sample applying mechanism configured to apply a blood sample onto the slide;

a slide smearing mechanism configured to smear the blood sample on the slide to make a smear;

a staining mechanism, comprising at least one reagent vessel and a third driving device, wherein the reagent vessel is configured to store a staining reagent and has an opening at its top, and the third driving device is configured to drive the reagent vessel to reciprocate in a single direction; and a smear transferring mechanism comprising a first driving device, a second driving device, and a manipulator, wherein the manipulator is configured to extract the smear and place the smear into the reagent vessel for staining, the first driving device is configured to drive the manipulator to perform reciprocating translation in a first direction, and the second driving device is configured to drive the manipulator to reciprocate in a second direction, the first direction being perpendicular to the second direction;

wherein the second driving device is configured to drive the manipulator to move toward the reagent vessel to place the smear through the opening into the reagent vessel for staining or remove the smear from the reagent vessel, after the third driving device and the first driving device respectively drive the reagent vessel and the manipulator to move to corresponding cooperative positions.

In the first aspect, the smear preparation machine proposed by the disclosure completes operations such as loading a slide, applying a blood sample and smearing the blood sample through the slide loading mechanism, the sample applying mechanism, and the slide smearing mechanism to prepare a smear. Then, the smear is stained by the cooperative movement of the staining mechanism and the smear transferring mechanism. The staining mechanism drives the reagent vessel containing the staining reagent to perform reciprocating translation in the first direction through the first driving system, and the smear transferring mechanism drives the manipulator carrying the smear to perform reciprocating translation in the second direction through the second driving system. Then, after the reagent vessel and the manipulator respectively translate to the corresponding cooperative positions, the second driving system further drives the manipulator to move toward the reagent vessel to place or extract the smear. In the smear preparation machine of the present application, motions of a manipulator in three degrees of freedom in space are performed by the cooperation between the manipulator and the reagent vessel, which simplifies the complexity of the mechanism and motion tracks of the manipulator, improves the working efficiency of the smear preparation machine, reduces the occupied space and further reduces costs of the smear preparation machine.

In a second aspect, the disclosure proposes a method for controlling a smear preparation machine, comprising the following steps:

applying a blood sample onto a slide and smearing the blood sample to prepare a smear;

driving a manipulator to extract the smear, and driving the manipulator to translate to a placing position in a second direction;

driving a base to translate in a first direction to drive at least one reagent vessel to translate to a smear receiving position; and driving the manipulator to move toward the reagent vessel to place the smear into the reagent vessel for staining of the smear.

In an embodiment, the at least one reagent vessel comprises a plurality of reagent vessels each for storing a staining reagent, the plurality of reagent vessels comprise a first reagent vessel and a second reagent vessel, the staining reagent in the first reagent vessel is different from the staining reagent in the second reagent vessel, and the smear is treated in the first reagent vessel first and then treated in the second kit; and the method further comprises:

driving the manipulator located at the placing position to move toward the first reagent vessel, so as to remove the smear subjected to first treatment from the first reagent vessel;

driving the base to translate in the first direction and/or driving the manipulator to translate in the second direction, so that the second reagent vessel is at the smear receiving position, and the manipulator is located at the placing position corresponding to the second reagent vessel; and driving the manipulator to move toward the second reagent vessel to place the smear into the second reagent vessel for second treatment.

In an embodiment, the at least one reagent vessel is configured to store a staining reagent, and the step of the driving the reagent vessel to translate to the smear receiving position in the first direction further comprises:

driving the base to perform reciprocating translation in the first direction to uniformly mix the staining reagent in the reagent vessel; and driving the base in the first direction to translate the reagent vessel after uniform mixing to the smear receiving position.

In the second aspect, according to the method for controlling a smear preparation machine of the present application, the reagent vessel and the manipulator are driven separately after the smear is prepared, so that the two cooperate so as to place or remove the smear. The three-degree-of-freedom motion originally completed by the manipulator alone is performed by cooperation between the reagent vessel and the manipulator, which simplifies the complexity of controlling the manipulator, and at the same time has the effects of improving the working efficiency of the smear preparation machine, reducing the occupied space and reducing costs of the smear preparation machine.

BRIEF DESCRIPTION OF THE DRAWINGS

FIG. 11 is a flowchart of a method for controlling a smear preparation machine according to the disclosure;

FIG. 12 is a flowchart of another embodiment of a method for controlling a smear preparation machine according to the disclosure.

DETAILED DESCRIPTION

The technical solutions in the embodiments of the disclosure will be described below clearly and completely in conjunction with the accompanying drawings in the embodiments of the disclosure. The embodiments described are merely some rather than all of the embodiments of the disclosure. Based on the embodiments in the disclosure, all other embodiments that are obtained by those of ordinary skill in the art without involving any inventive effort shall all fall within the scope of protection of the disclosure.

The serial numbers themselves for the components herein, for example, "first" and "second", are merely used to distinguish the described objects, and do not have any sequential or technical meaning. Moreover, as used in the present application, "connection" or "coupling", unless otherwise specified, comprises both direct and indirect connections (couplings). In the description of the present application, it should be understood that the orientation or position relationship indicated by the terms "upper", "lower", "front", "rear", "left", "right", "vertical" "horizontal", "top", "bottom", "inner", "outer", "clockwise", "counterclockwise" etc. are based on the orientation or position relationship shown in the accompanying drawings and are intended to facilitate the description of the disclosure and simplify the description only, rather than indicating or implying that the apparatus or element referred to must have a particular orientation or be constructed and operated in a particular orientation, and therefore cannot be understood as limiting the disclosure.

In the disclosure, unless otherwise explicitly specified and defined, the expression a first feature being "on" or "underneath" a second feature may be the case that the first feature is in direct contact with the second feature, or the first feature is in indirect contact with the second feature via an intermediate medium. Furthermore, the expression the first feature being "over", "above" and "on top of" the second feature may be the case that the first feature is directly above or obliquely above the second feature, or only means that the level of the first feature is higher than that of the second feature. The expression the first feature being "under", "below" and "beneath" the second feature may be the case that the first feature is directly below or obliquely below the second feature, or only means that the level of the first feature is less than that of the second feature.

Figure 1:
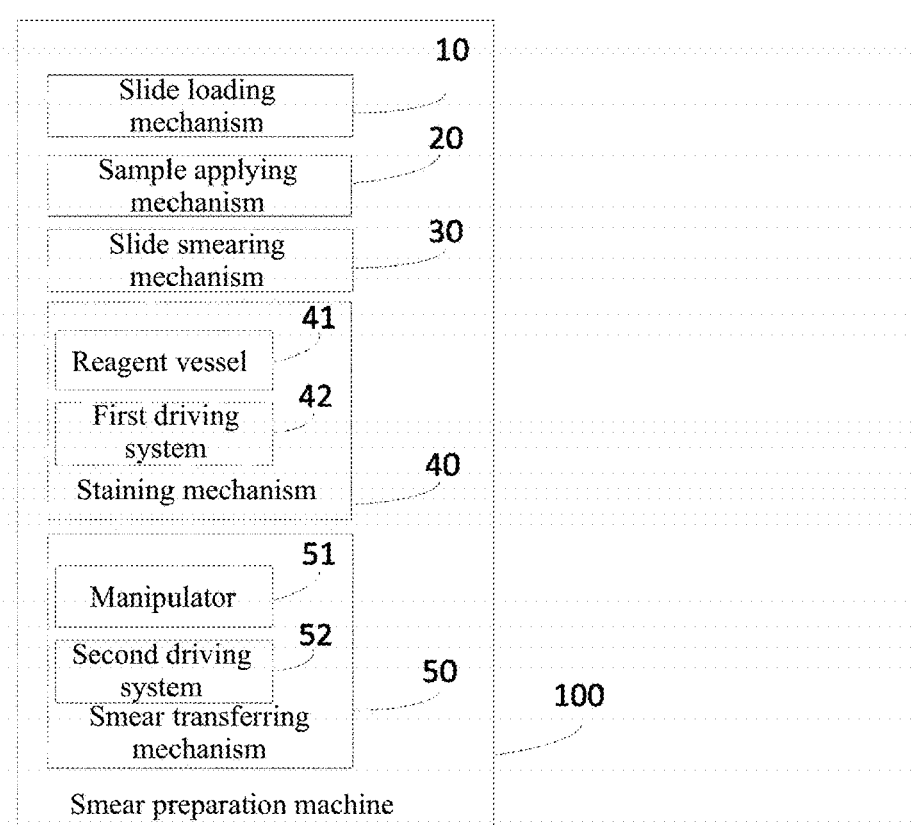
FIG. 1 is a schematic diagram of a system framework of a smear preparation machine according to the disclosure.

Reference is now made to a smear preparation machine 100 shown in FIG. 1, which may be configured to prepare smears of samples such as blood and body fluids. The smear preparation machine 100 comprises a slide loading mechanism 10, a sample applying mechanism 20, a slide smearing mechanism 30, a staining mechanism 40, and a smear transferring mechanism 50. The slide loading mechanism 10 is configured to extract a slide and load the slide to a corresponding position, so as to facilitate a sample applying operation. Before the slide is extracted, an operation of detecting the left and right of the slide, an operation of cleaning the slide and other operations may also be performed, and then the slide is loaded by the slide loading mechanism 10. The slide loading mechanism 10 may also print relevant information on the loaded slide, and also perform operations such as an operation of detecting the front and back of the slide. After a sample applying probe of the sample applying mechanism 20 drips a sample onto the slide, the slide smearing mechanism 30 performs a slide smearing operation, so that a blood film shape is formed by smearing the blood sample on the slide through the slide smearing mechanism 30. Generally, after the slide smearing operation is completed, the blood film on the slide may be dried to stabilize its shape, so as to prepare the slide after sample applying into a smear 200. In some embodiments, the slide may be driven to be flipped before the blood film is dried, to meet corresponding requirements. In some embodiments, drying detection may also be performed on the dried smear 200 to determine drying effect of the blood film. In some embodiments, blood film expanding detection may also be performed on the dried smear 200 to determine whether the blood film is expanded and whether an expanded state meets requirements. Therefore, the smear preparation machine 100 completes operations such as loading a slide, applying a blood sample and smearing the blood sample through the slide loading mechanism 10, the sample applying mechanism 20, and the slide smearing mechanism 30 to prepare a smear 200 for microscopic examination.

Figure 2:
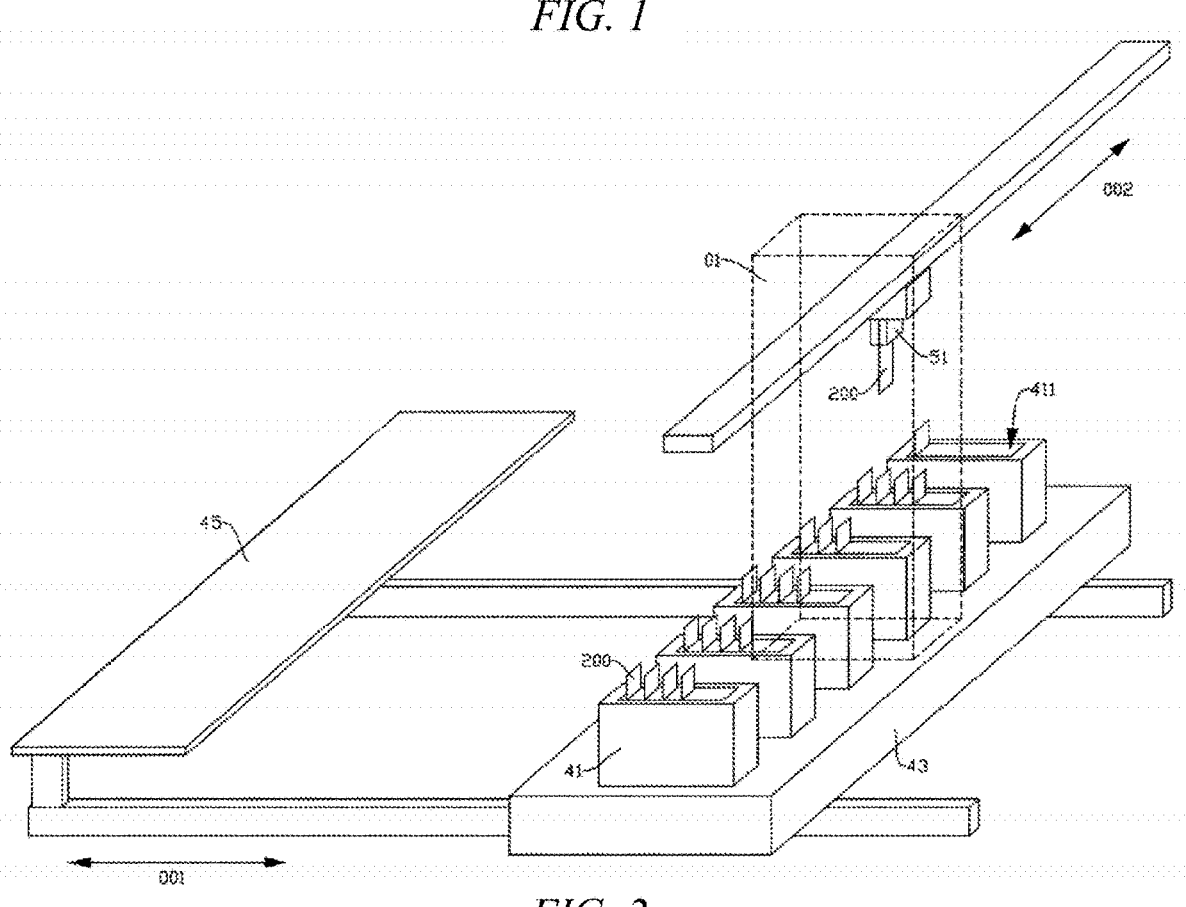
FIG. 2 is a schematic diagram of a staining mechanism and a smear transferring mechanism in an embodiment of a smear preparation machine according to the disclosure.

Certainly, before the microscopic examination of the smear 200, leucocytes, erythrocytes, platelets, etc. in the blood sample need to be stained with specific colors for identification. Referring to FIG. 2, the staining of the smear 200 before microscopic examination is completed by the staining mechanism 40 and the smear transferring mechanism 50. The staining mechanism 40 comprises at least one reagent vessel 41 and a first driving system 42. The reagent vessel 41 is configured to store a reagent vessel, and the top of the reagent vessel 41 is provided with an opening 411, so as to place the smear 200 into the reagent vessel 41 from the opening 411. After being placed in the reagent vessel 41, the smear 200 fully contacts and reacts with the reagent vessel in the reagent vessel 41, so as to achieve the staining effect. The reagent vessel 41 is movably arranged in the smear preparation machine 100, and the reagent vessel 41 is capable of performing translation of a single-degree-of-freedom in the smear preparation machine 100. The first driving system 42 is configured to drive the reagent vessel 41 to perform reciprocating translation in a first direction 001, so as to cooperate with the action of the smear transferring mechanism 50 to complete operations of placing a smear and removing a smear. The smear transferring mechanism 50 comprises a manipulator 51 and a second driving system 52. The manipulator 51 is configured to extract the smear 200 prepared from the slide, and place the smear 200 into the reagent vessel 41 for staining. A moving direction of the manipulator 51 comprises a second direction 002, and the second direction 002 is set to be different from the first direction 001 of the reagent vessel 41. The manipulator 51 performs reciprocating translation in the second direction 002 to cooperate with the action of the staining mechanism 40 to complete operations of placing a smear and removing a smear. The reciprocating translation of the manipulator 51 in the second direction 002 is driven by the second driving system 52.

Still referring to FIG. 2, the smear preparation machine 100 is provided with a cooperative position 01 corresponding to the reagent vessel 41 and the manipulator 51 at the same time. When the first driving system 42 drives the reagent vessel 41 to translate in the first direction 001 to the cooperative position 01, and the second driving system 52 drives the manipulator 51 to translate in the second direction 002 to the cooperative position 01, the reagent vessel 41 and the manipulator 51 are in a state of being opposite to each other at the cooperative position 01. That is, the manipulator 51 is directly facing the opening 411 of the reagent vessel 41. Then, the second driving system 52 further drives the manipulator 51 to move toward the reagent vessel 41, so as to place the smear 200 carried by the manipulator 51 from the opening 411 into the reagent vessel 41 for a staining operation, or remove the stained smear 200 in the reagent vessel 41 from the opening 411.

In the smear preparation machine 100 of the present application, since both the reagent vessel 41 and the manipulator 51 are movably arranged in the smear preparation machine 100, the reagent vessel 41 and the manipulator 51 can move relatively and cooperatively, so that the three-degree-of-freedom motion of the smear 200 in the smear preparation machine 100 driven by the smear transferring mechanism 50 is perform by the cooperation between the reagent vessel 41 and the manipulator 51. It is relatively simple for the first driving system 42 to drive the reagent vessel 41 to perform a single-degree-of-freedom translation motion, which can be realized by a structure such as a sliding rail arranged in the first direction 001. The translation motion of the manipulator 51 driven by the second driving system 52 in the second direction 002 may also be realized by a structure such as a sliding rail arranged in the second direction 002. Further, the second driving system 52 drives the manipulator 51 to move toward the reagent vessel 41 at the cooperative position 01, which is also a single-degree-of-freedom motion, and may also be realized by a structure such as a telescopic mechanism or a sliding rail arranged toward the opening 411. In addition, the translation motion of the reagent vessel 41 in the first direction 001 by the first driving system 42 and the translation motion of the manipulator 51 in the second direction 002 by the second driving system 52 are both single-degree-of-freedom motions, which can be performed simultaneously and controlled separately without affecting each other. After the manipulator 51 and the reagent vessel 41 are both moved to the cooperative position 01, the second driving system 52 further drives the manipulator 51 to perform a single-degree-of-freedom motion toward the reagent vessel 41. The conventional multi-degree-of-freedom is divided independently, which reduces requirements on the accuracy of a single manipulator assembly, thereby reducing manufacturing costs. In the whole process of staining the smear 200 by the smear preparation machine 100 of the present application, the motions of the manipulator 51 and the reagent vessel 41 in each degree of freedom are single-degree-of-freedom motions, and the three single-degree-of-freedom motions are all separately controlled. Compared with the motion and control method for completing operations such as smear transferring and staining treatment only through the three-degree-of-freedom motion of the manipulator in the prior art, the smear preparation machine 100 of the present application has a more simplified internal structure and facilitates control. Moreover, because the translation of the reagent vessel 41 and the translation of the manipulator 51 do not affect each other, the two can move relatively simultaneously, which shortens the translation stroke compared with the case where the manipulator 51 moves alone. Under the condition that the speed of the manipulator 51 is kept constant, the working efficiency of the smear preparation machine is improved; and at the same time, the occupied internal space of the smear preparation machine 100 can further be reduced to achieve the effect of reducing the cost of the smear preparation machine 100.

Figures 3, 4:
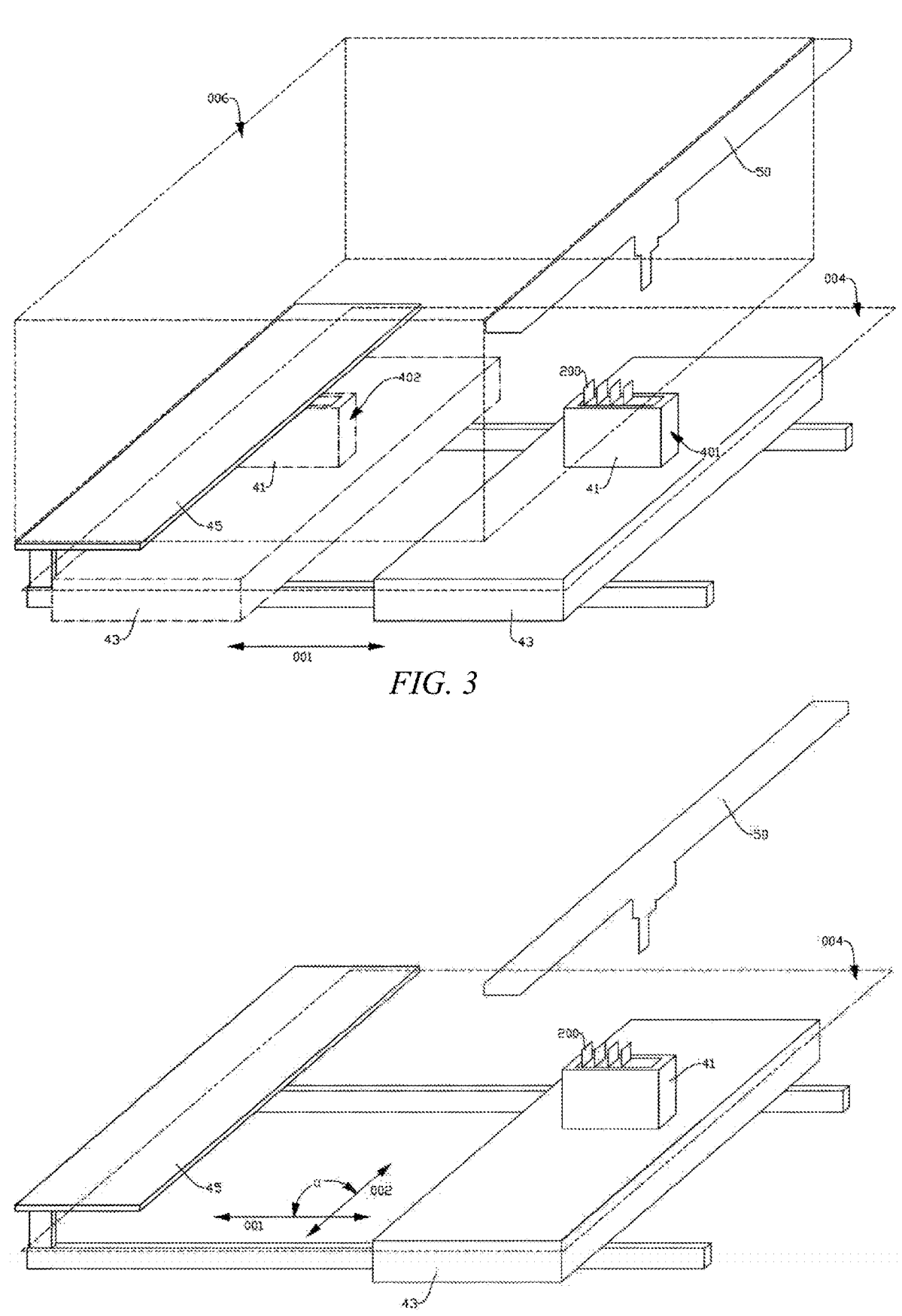
FIG. 3 is a schematic diagram of a staining mechanism in another embodiment of a smear preparation machine according to the disclosure.
FIG. 4 is a schematic diagram of a staining mechanism and a smear transferring mechanism in another embodiment of a smear preparation machine according to the disclosure.

Referring to the embodiment of FIG. 3, the staining mechanism 40 is provided with a smear receiving position 401 and a storage position 402 corresponding to the reagent vessel 41. It can be understood that the smear receiving position 401 and the storage position 402 are aligned with each other in the first direction 001, so that the first driving system 42 drives the reagent vessel 41 to move between the smear receiving position 401 and the storage position 402. The smear receiving position 401 corresponds to the cooperative position 01 where the reagent vessel 41 and the manipulator 51 perform an operation of handing over the smear 200. When the staining mechanism 40 is in a non-operating state, i.e., no smear 200 is being stained in the reagent vessel 41, the first driving system 42 drives the reagent vessel 41 to stand at the storage position 402. When the staining mechanism 40 is in an operating state, the first driving system 42 drives the reagent vessel 41 to translate in the first direction 001 to move to the smear receiving position 401, so that the reagent vessel cooperates with the manipulator 51 to place the smear 200 into the reagent vessel 41 located at the smear receiving position 401, or the manipulator 51 removes the smear 200 from the reagent vessel 41 located at the smear receiving position 401.

In an embodiment, the reagent vessel 41 stores a staining reagent, and the reagent vessel 41 is configured to translate repeatedly in the first direction 001 to move between the smear receiving position 401 and the storage position 402, thus, in order to avoid overflow of the staining reagent during the translation of the reagent vessel 41, the smear receiving position 401 and the storage position 402 is preferably set in a same horizontal plane, and the first direction 001 is also preferably set as a horizontal direction, so that when moving between the positions under the driving of the first driving system 42, the reagent vessel 41 can always be in a first horizontal plane 004 without displacement in the vertical direction. The movement of the reagent vessel 41 in the first horizontal plane 004 to switch between the smear receiving position 401 and the storage position 402 can ensure stable storage of the staining reagent in the reagent vessel 41 and avoid unnecessary waste of the staining reagent caused by overflow from the reagent vessel 41.

In an embodiment, as mentioned above, according to the type of the staining reagent stored in the reagent vessel 41, it is preferable to prepare a mixed reagent of a stain and a buffer solution according to a certain ratio, or to perform a solution addition after the staining reagent is consumed and volatilized. If the reagent vessel 41 is in a standing state, different components or new and old liquids in the reagent vessel 41 are prone to delamination. In this case, if the manipulator 51 is driven to extend into the reagent vessel 41 through the opening 411 for uniform mixing, on the one hand, the manipulator 51 may pollute the staining reagent, and on the other hand, the manipulator 51 will take away part of the staining reagent after uniform mixing, causing unnecessary consumption of the staining reagent. Therefore, the first driving system 42 may be used to drive the reagent vessel 41 to perform reciprocating translation in the first direction 001 to uniformly mix the staining reagent in the reagent vessel 41, and then the first driving system 42 drives the reagent vessel 41 to move to the smear receiving position 401 to receive the smear 200 that is to be placed in. The first driving system 42 quickly drives the reagent vessel 41 in a reciprocating manner based on requirements for uniform mixing, which can effectively eliminate the delamination of the staining reagent in the reagent vessel 41, and the uniformly mixed staining reagent can also be used to more effectively perform operations such as staining on the smear 200.

Still referring to FIG. 3, in the internal space of the smear preparation machine 100, because the reagent vessel 41 can cooperate with the manipulator 51 to perform translation motion under the driving of the first driving system 42, and relative to the reagent vessel 41, the manipulator 51 only needs to perform a single-degree-of-freedom translation in the second direction 002 and a motion toward the reagent vessel 41 located at the smear receiving position 401, the manipulator 51 enables operations of placing and extracting the smear 200 without covering the upper space of the whole reagent vessel 41. Therefore, above the first horizontal plane 004, the smear preparation machine 100 does not need to reserve a space corresponding to a region between the storage position 402 and the smear receiving position 401 for the motion of the manipulator 51, such that this region forms an accommodating space 006. The accommodating space 006 may be used for storing other assemblies of the smear preparation machine 100, for example, one or more of a control circuit board, an air pressure source, a vacuum chamber, etc. Therefore, a part of space volume is saved for the interior of the smear preparation machine 100, so that the internal mechanism arrangement of the smear preparation machine 100 is more compact, which is beneficial to the overall volume control of the smear preparation machine 100.

In an embodiment, referring to FIG. 4, the second direction 002 in which the second driving system 52 drives the manipulator 51 to translate has a projection on the first horizontal plane 004, which forms a first included angle α with the first direction 001. Because the first direction 001 and the second direction 002 are arranged differently, the difference here may be understood as that when the first direction 001 and the second direction 002 are projected on a same plane, they intersect with each other to form the first included angle α; and it may also be understood that the first direction 001 and the second direction 002 are parallel to each other in space, but not in the same horizontal plane. It can be understood that, in the latter case, the manipulator 51 and the reagent vessel 41 are moved in the same motion direction, but at different heights, toward each other or away from each other. The translation motion of the reagent vessel 41 only helps to shorten the motion stroke of the manipulator 51, and the transport state of the smear 200 by the manipulator 51 and the reagent vessel 41 is limited to the single-degree-of-freedom motion in the first direction 001, which impairs the working efficiency of the smear preparation machine 100. Moreover, the accommodating space 006 obtained therefrom is also in a straight shape, which has low usable value. In the embodiment of FIG. 4, the projections of the first direction 001 and the second direction 002 in the first horizontal plane 004 form the first included angle α, and the first included angle α may be arbitrarily set to be from greater than 0° to less than 180°. In this case, the cooperative movement of the manipulator 51 with the reagent vessel 41 can be expanded in a plane, and the plane movement may be decomposed into two-degree-of-freedom linear motions in the first direction 001 and the second direction 002. In this case, the smear 200 can be moved in a larger area under the cooperative movement of the manipulator 51 and the reagent vessel 41. It can be understood that when the first included angle α is 90°, the first direction 001 is perpendicular to the second direction 002. The manipulator 51 and the reagent vessel 41 perform linear translation motions perpendicular to each other, so that a larger cooperative area can be realized under the shortest movement stroke, and the volume of the accommodating space 006 formed therefrom is also the largest.

Referring back to FIG. 2, the staining mechanism 40 also comprises a base 43 connected between the reagent vessel 41 and the first driving system 42. The first driving system 42 drives the base 43 to perform reciprocating translation in the first direction 001, so as to drive the reagent vessel 41 to perform reciprocating translation in the first direction 001. Because of the arrangement of the base 43, the smear preparation machine 100 may be provided with a plurality of reagent vessels 41 in the staining mechanism 40. The plurality of reagent vessels 41 may store different staining reagents, to perform different staining operations on the smear 200 by the staining mechanism 40. Correspondingly, the staining mechanism 40 is provided with at least one smear receiving position 401 corresponding to each reagent vessel 41, and the manipulator 51 is further configured to place or remove a smear 200 into or from each reagent vessel 41 at the smear receiving position 401 corresponding to said reagent vessel 41.

In an embodiment, the plurality of reagent vessels 41 are sequentially arranged on the base 43 in the first direction 001 or the second direction 002. It can be understood that in this case, a plurality of smear receiving positions 401 corresponding to the plurality of reagent vessels 41 are also arranged in the first direction 001 or the second direction 002. When the manipulators 51 need to operate corresponding to different reagent vessels 41, if the plurality of reagent vessels 41 are arranged in the first direction 001, the manipulators 51 may be kept still, and the first driving system 42 drives the base 43 to translate in the first direction 001, so as to successively drive the corresponding different reagent vessels 41 to their corresponding smear receiving positions 401 to form corresponding cooperative positions 01 with the manipulators 51, and then the second driving system 52 drives the manipulators 51 to successively move toward different reagent vessels 41 and perform the operations of placing or removing a smear 200; or, if the plurality of reagent vessels 41 are arranged in the second direction 002, the reagent vessels 41 can be kept still, and the second driving system 52 drives the manipulators 51 to translate in the second direction 002, so that the manipulator 51 successively form different cooperative positions 01 with different reagent vessels 41, and the operations of placing or removing a smear 200 is successively performed. As the plurality of reagent vessels 41 are arranged in the translation direction of the reagent vessels 41, or arranged in the translation direction of the manipulators 51, one of the reagent vessels 41 or the manipulators 51 is kept still, and only the other of the manipulators 51 or the reagent vessels 41 is driven to translate to form a cooperative state of a plurality of cooperative positions 01, and a plurality of subsequent operations are performed in an orderly manner. In the embodiment of FIG. 2, the base 43 is arranged in a rectangular shape. Long sides of the rectangle are arranged in the first direction 001, and short sides of the rectangle are arranged in the second direction 002. In combination with the movement direction of the reagent vessels 41 and the arrangement direction of the plurality of reagent vessels 41, the shape of the base 43 can be minimized, and the volume of the staining mechanism 40 is reduced.

Figure 5:
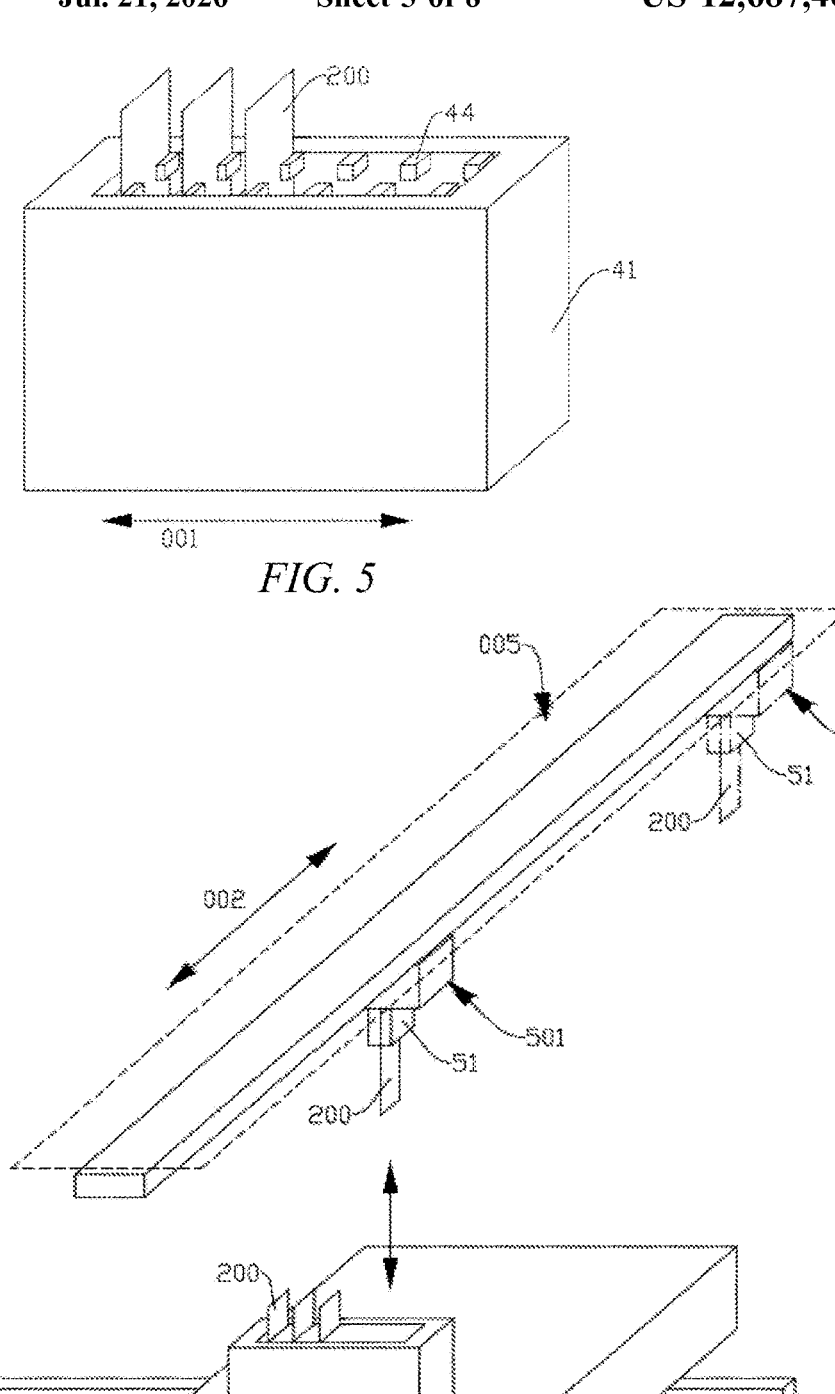
FIG. 5 is a schematic diagram of a reagent vessel in another embodiment of a smear preparation machine according to the disclosure.

Referring to FIG. 5, the reagent vessel 41 comprises at least one placing component 44. Each placing component 44 is configured to provide an insertion area (not shown) into which a smear 200 is inserted, so that the smear 200 can be stably positioned when accommodated in the insertion area, and is immersed in the staining reagent stored in the reagent vessel 41 to receive corresponding operation treatment. The placing component 44 may be detachably fixed in the reagent vessel 41, or may be a slot formed integrally on the inner wall of the reagent vessel 41, etc. The implementation details of the placing component 44 are not specifically limited in the smear preparation machine 100 of the present application.

In an embodiment, each reagent vessel comprises a plurality of placing components 44, so that a plurality of insertion areas are provided in the reagent vessel 41, and a single reagent vessel 41 can accommodate a plurality of smears 200, thereby realizing batch processing of the smears 200 by the reagent vessel 41. The arrangement of the placing components 44 in the reagent vessel 41 may also be arranged in the first direction 001 or the second direction 002. When the plurality of reagent vessels 41 are arranged on the base 43 in the first direction 001, the plurality of placing components 44 in each reagent vessel 41 may be arranged in the second direction 002; and when the plurality of reagent vessels 41 are arranged on the base 43 in the second direction 002, the plurality of placing components 44 in each reagent vessel 41 are arranged in the first direction 001. It can be understood that as the placing components 44 are arranged in the translation direction of the reagent vessels 41 or in the translation direction of the manipulator 51, when the manipulator 51 continuously places smears 200 into a same reagent vessel 41 or continuously removes smears 200 from a same reagent vessel 41, one of the manipulator 51 or the reagent vessel 41 is kept in a static state, and all operations can be completed only by moving the other one. It should be noted that if the plurality of placing components 44 are arranged in the reagent vessel 41 in the first direction 001, in the staining mechanism 40, the corresponding smear receiving position 401 of each reagent vessels 41 is further divided into a plurality of sub-smear receiving positions (not shown in the figures), so that the reagent vessel 41 can form a cooperative position 01 with the manipulator 51 at each sub-smear receiving position, and the manipulator 51 can place a smear 200 into the insertion area corresponding to the sub-smear receiving position when moving toward the reagent vessel 41, or remove a smear 200 from the insertion area corresponding to the sub-smear receiving position.

Referring back to FIG. 2 again, for the solution of the reagent vessel being in a standing state, according to the type of the staining reagent stored, it may be necessary to prepare a mixed reagent of a stain and a buffer solution according to a certain ratio, or to perform solution addition after the staining reagent is consumed and volatilized. In this case, for the reagent vessel in the standing state, it is prone to the delamination of old and new solutions, and does not facilitate uniform mixing. On the other hand, when the reagent vessel is in a non-operating state, a sealing cover is usually provided at the position of the top opening thereof to prevent the volatilization of the staining reagent. However, the sealing cover will affect the operation of the manipulator. Therefore, in the smear preparation machine 100, when the reagent vessel 41 is in a non-operating state, a sealing cover is usually provided at the position of the top opening 411 thereof to prevent volatilization of the staining reagent. However, in the smear preparation machine where the reagent vessel stands and the staining operation is performed only by the motion of the manipulator, a fixed arrangement of the sealing cover relative to the reagent vessel will interfere with the operation of placing and removing smears by the manipulator. In the smear preparation machine 100 of the present application, because when the reagent vessel 41 is in a non-operating state, the first driving system 41 can bring the reagent vessel 41 from the smear receiving position 401 back to the storage position 402 for storage, thereby facilitating the arrangement of the sealing cover for the staining mechanism 40. In the embodiment of FIG. 2, the staining mechanism 40 is provided with a fixed cover plate 45 at a position corresponding to the storage position 402 of the reagent vessel 41. The cover plate 45 is located in a position higher than the opening 411 of the reagent vessel 41 in the vertical direction, so that when the first driving system 42 drives the reagent vessel 41 to be located at the storage position 402, the cover plate 45 covers the opening 411 of the reagent vessel 41 to seal and protect the staining reagent in the reagent vessel 41. It can be understood that the cover plate 45 can prevent the volatilization of the staining reagent on the one hand, and can also cover the opening 411 on the other hand to prevent impurities from falling into the reagent vessel 41 and polluting the staining reagent when the staining mechanism 40 is in a non-operating state.

Figure 6:
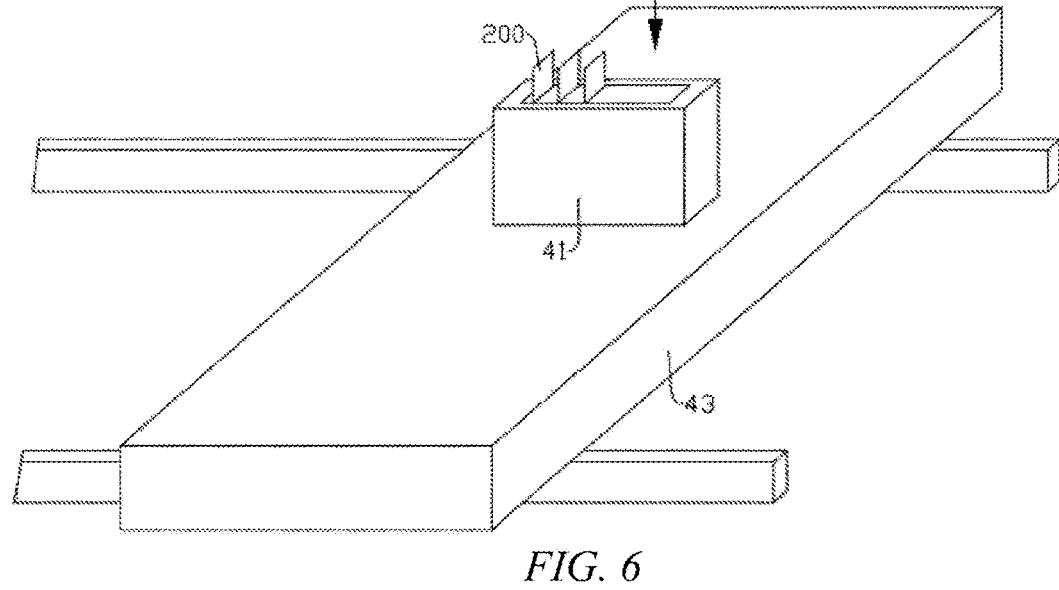
FIG. 6 is a schematic diagram of a smear transferring mechanism in another embodiment of a smear preparation machine according to the disclosure.

It can be understood that the height of the smear 200 in the reagent vessel 41 can be controlled by arranging the placing component 44, so that a gap between the cover plate 45 and the opening 411 of the reagent vessel 41 is reduced, and a better sealing effect is achieved. Even the smear 200 may be completely accommodated in the reagent vessel 41, so that the cover plate 45 and the reagent vessel 41 directly cooperate to achieve a better sealing effect. In an embodiment, referring to FIG. 6, in a moving path of the manipulator 51, the smear transferring mechanism 50 is provided with a smear taking position 502 and the placing position 501 corresponding to the manipulator 51. It can be understood that the smear taking position 502 and the placing position 501 are aligned with each other in the second direction 002, so that the second driving system 52 drives the manipulator 51 to move between the smear taking position 502 and the placing position 51. The placing position 501 corresponds to the cooperative position 01 where the reagent vessel 41 and the manipulator 51 perform an operation of handing over the smear 200. The second driving system 52 comprises a first driving device (not shown in the figures), and through the first driving device, the second driving system 52 drives the manipulator 51 to move between the smear taking position 502 and the placing position 501. The manipulator 51 extracts, at the smear taking position 502, the smear 200 that needs to be stained; and the manipulator 51 cooperates with the reagent vessel 41 at the placing position 501, so that the smear 200 is placed into the reagent vessel 41, or the smear 200 is removed from the reagent vessel 41.

In an embodiment, the second driving system 52 further comprises a second driving device (not shown in the figures). The second driving device is configured to, when the manipulator 51 is at the placing position 501, drive the manipulator 51 to move toward the reagent vessel 41, so as to place the smear 200 into the reagent vessel 41 or remove the smear 200 from the reagent vessel 41. Through the first driving device and the second driving device, the second driving system 52 respectively drives the manipulator 51 to translate between the placing position 501 and the smear taking position 502, and drives the manipulator 51 to move toward the reagent vessel 41, so that the motion of the manipulator 51 is also divided into two-degree-of-freedom unidirectional reciprocating motions. Compared with the solution that the reagent vessel is static, a motion trajectory of the manipulator 51 of the smear preparation machine 100 of the present application is simplified, and through the decomposition of the degrees of freedom, the requirement on higher coupling control precision of the manipulator 51 caused by the coupling motion is further reduced, and requirements on precision of a single assembly are lowered, thereby reducing the manufacturing cost of the smear preparation machine 100.

In an embodiment, in conjunction with the embodiment of horizontal movement of the staining mechanism 40 in the first horizontal plane 004, the first driving device is preferably configured to drive the manipulator 51 to translate horizontally in a second horizontal plane 005, so as to enable the manipulator 51 to move between the smear taking position 502 and the placing position 501. The manipulator 51 is also designed to move horizontally, which enables the manipulator 51 to have a larger range of motion under the same translation stroke of the manipulator 51. Or it is described as that when the manipulator 51 moves within a fixed range, the movement stroke can be control to be minimum by horizontal translation of the manipulator 51. When the manipulator 51 has a smaller movement stroke, the first driving device has a lower load, which can improve the working efficiency of the smear preparation machine 100 and reduce the power consumption. On the other hand, the motion direction in which the second driving device drives the manipulator 51 toward the reagent vessel 41 may be set as a vertical direction. That is, the second driving device drives the manipulator 51 at the placing position 501 to perform reciprocating translation in the vertical direction so as to place the smear 200 into the reagent vessel 41 or remove the smear 200 from the reagent vessel 41. The opening 411 of the reagent vessel 41 is at the upper portion of the reagent vessel 41. By moving toward the reagent vessel 41 in the vertical direction to place or remove the smear 200, the moving distance of the second driving device can also be shortened, and the process speed of the second driving device can be accelerated. In addition, the smear 200 is usually rectangular and strip-shaped, and placing or removing the smear 200 from the reagent vessel 41 in the vertical direction suits the shape of the smear 200 more closely, thus avoiding to a large extent the damage to the smear 200 after an alignment error occurs to the manipulator 51 and the reagent vessel 41 at the cooperative position 01.

Figure 7:
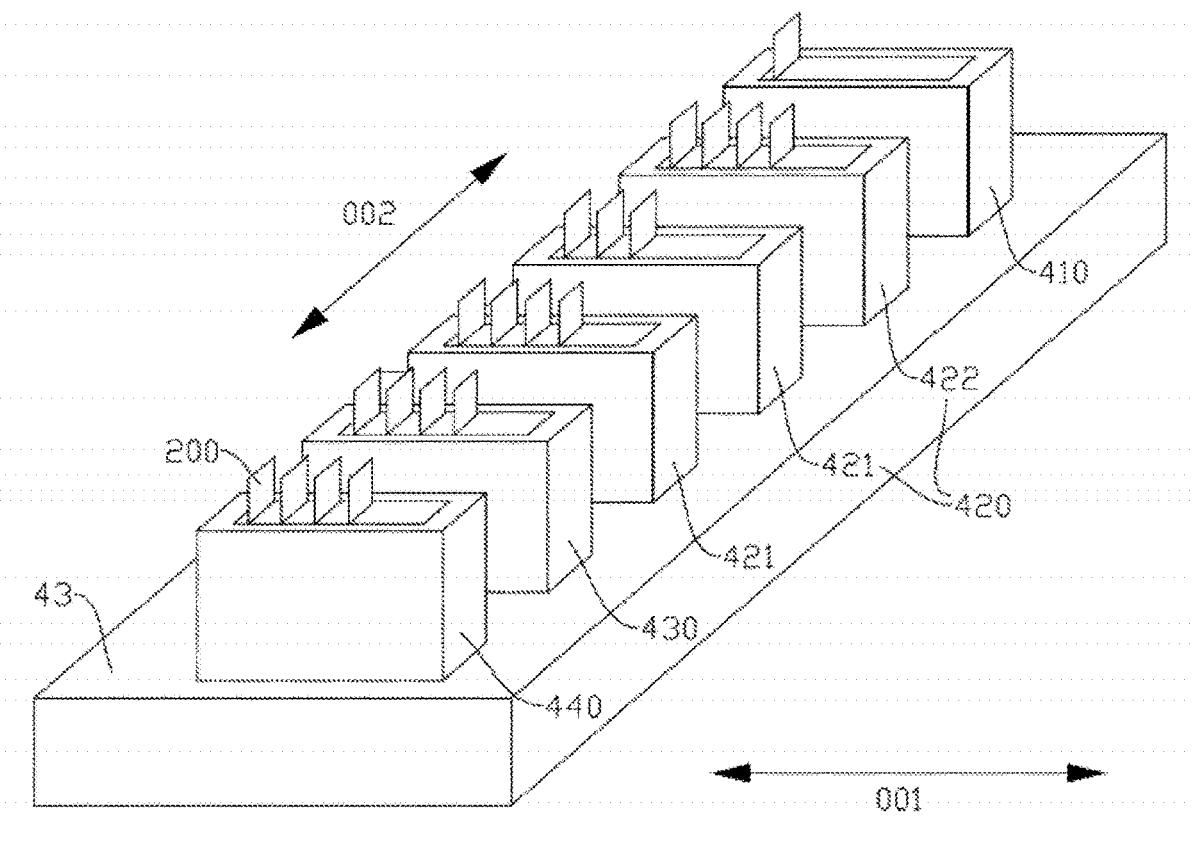
FIG. 7 is a schematic diagram of a staining mechanism in another embodiment of a smear preparation machine according to the disclosure.

Referring to FIG. 7, for the staining treatment of the smear 200 in the staining mechanism 40, a plurality of staining processes are usually executed, and it is necessary to perform staining improving, cleaning and other treatments on the smear 200 between the plurality of staining processes, so as to ensure a better observation effect during microscopic examination of the stained smear 200. Therefore, the plurality of reagent vessels 41 generally comprise a primary staining vessel 410 and an isolation vessel 420, and in some embodiments, may further comprise a secondary staining vessel 430. A first staining liquid is stored in the primary staining vessel 410 for primary staining of the smear 200. The first staining liquid is a mixture of a first biological dye and a second biological dye, wherein the first biological dye is capable of staining acidophilic substances in the blood sample, and the second biological dye is capable of staining alkalophilic substances in the blood sample. A reagent is stored in the isolation vessel 420 to perform staining improving and/or cleaning and other treatments of the blood sample after the primary staining and before secondary staining. A second staining liquid is stored in the secondary staining vessel 430 for the secondary staining of the smear 200, the second staining liquid is a mixture of a third biological dye and a buffer solution, and the third biological dye is capable of staining acidophilic substances or alkalophilic substances in the blood sample. It should be noted that, not all staining reagents are used for smear staining. Here, staining reagents may comprise reagents in different operations of primary staining, staining improving, cleaning and secondary staining, or may comprise different cleaning reagents in different reagent vessels 41 for cleaning operation. For example, different cleaning liquids in cleaning reagents, or different proportions of various cleaning liquids after mixing, etc., all belong to different staining liquids.

Further, to meet usage habits of most clinical departments, in an embodiment, the first staining liquid is a Wright-Giemsa stain, and the Wright-Giemsa stain comprises an eosin dye and a methylene blue dye. The second staining liquid is a mixture of a Giemsa stain and a buffer solution, and the Giemsa stain contains the methylene blue dye as a third biological dye.

The second staining liquid may also be a mixture of another stain with a methylene blue dye and a buffer solution, such as a Liu B stain.

Figure 8:
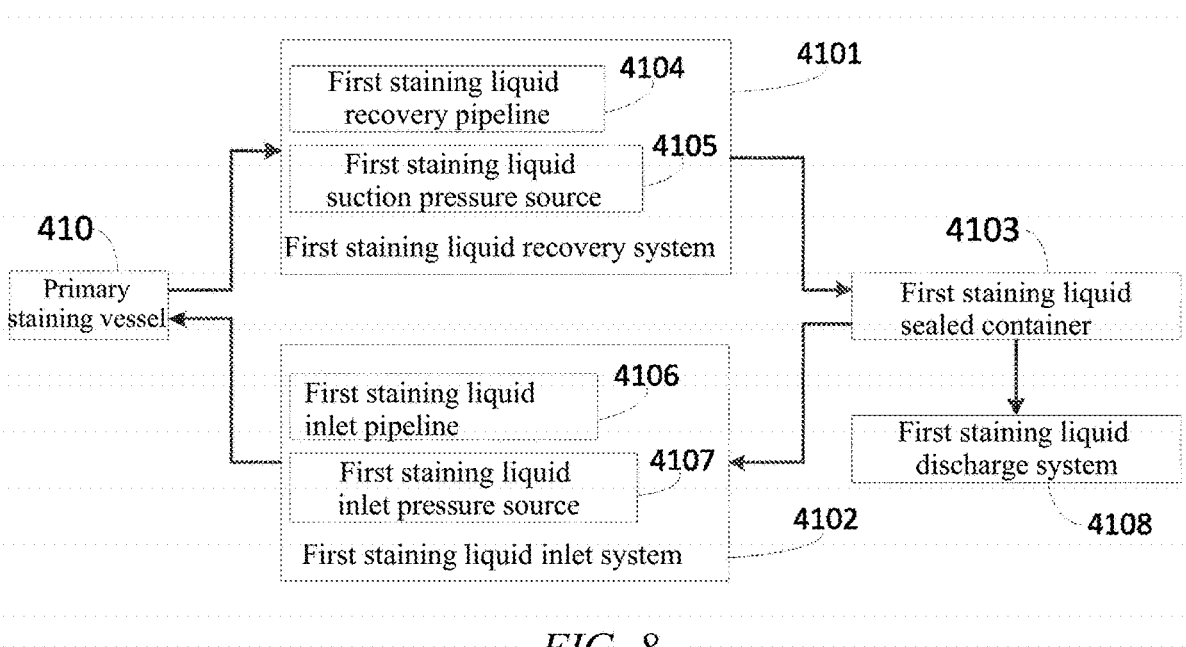
FIG. 8 is a schematic diagram of a staining mechanism in another embodiment of a smear preparation machine according to the disclosure.

In an automatic staining smear preparation machine, a vertical dip staining method is widely used, and its staining process basically imitates manual operation (such as SC-120 of Mindray and SP-10 of sysmex), and the staining is realized in a small container. The staining reagents in the container (including a first staining liquid, a second staining liquid, a buffer solution, a cleaning solution, etc.) are discharged after a single use, which leads to a large waste. In another immersion staining method (such as SP-50 of sysmex and RAL Stainer of RAL) used to reduce costs, slides are cyclically immersed in a large reagent vessel that can accommodate a plurality of slides, so that the reagents can be recycled. In an embodiment, referring to FIG. 8, the staining mechanism 40 further comprises a first staining liquid recovery system 4101, a first staining liquid inlet system 4102, and a first staining liquid sealed container 4103. The first staining liquid recovery system 4101 is respectively in fluid communication with the first staining liquid sealed container 4103 and the primary staining vessel 410, and the first staining liquid recovery system 4101 is configured to recover the corresponding first staining liquid in the primary staining vessel 410 into the first staining liquid sealed container 4103. The first staining liquid inlet system 4102 is respectively in fluid communication with the first staining liquid sealed container 4103 and the primary staining vessel 410, and the first staining liquid inlet system 4102 is configured to discharge the first staining liquid in the first staining liquid sealed container 4103 into the primary staining vessel 410. When the staining mechanism 40 is in a non-operating state, the first staining liquid can be accommodated and stored in the first staining liquid sealed container 4103. When the staining mechanism 40 is brought into the operating state, if the first staining liquid needs to be used to perform primary staining on the smear 200, the first staining liquid inlet system 4102 delivers the first staining liquid into the primary staining vessel 410 from the first staining liquid sealed container 4103; and after the primary staining is completed, the first staining liquid recovery system 4101 recovers the first staining liquid in the primary staining vessel 410 back into the first staining liquid sealed container 4103, so that the first staining liquid can be stored more reliably, and a phenomenon that the first staining liquid is polluted by impurities or lost by volatilization can be avoided to a great extent, so as to facilitate recycling of the first staining liquid.

It can be understood that the first staining liquid recovery system 4101 may further comprise a first staining liquid recovery pipeline 4104 and a first staining liquid suction pressure source 4105. The first staining liquid recovery system 4101 is respectively in fluid communication with the primary staining vessel 410 and the first staining liquid sealed container 4103 through the first staining liquid recovery pipeline 4104, and the first staining liquid suction pressure source 4105 is configured to suck the first staining liquid in the primary staining vessel 410 into the first staining liquid sealed container 4103; and the first staining liquid inlet system 4102 may further comprise a first staining liquid inlet pipeline 4106 and a first staining liquid inlet pressure source 4107. The first staining liquid inlet system 4102 is respectively in fluid communication with the primary staining vessel 410 and the first staining liquid sealed container 4103 through the first staining liquid inlet pipeline 4106, and the first staining liquid inlet pressure source 4107 discharges the first staining liquid in the first staining liquid sealed container 4103 into the primary staining vessel 410. In an embodiment, the first staining liquid recovery pipeline 4104 and the first staining liquid inlet pipeline 4106 may be the same pipeline, and the first staining liquid inlet pressure source 4105 and the first staining liquid suction pressure source 4107 may be the same pressure source.

In an embodiment, when there is no smear 200 to be stained in the primary staining vessel 410, or after the smear preparation machine 100 receives a first staining liquid recovery instruction issued by a user, the first staining liquid recovery system 4101 recovers the corresponding first staining liquid in the primary staining vessel 410 into the first staining liquid sealed container 4103 for storage. When there is a smear 200 to be stained in the primary staining vessel 410, or the smear preparation machine 100 receives a first staining liquid inlet instruction issued by the user, the first staining liquid inlet system 4102 discharges the first staining liquid in the first staining liquid sealed container 4103 into the primary staining vessel 410.

It should be noted that the smear preparation machine 100 may also automatically perform the action of recovering the first staining liquid. The smear preparation machine 100 may automatically control the recovery of the first staining liquid by determining whether there is a smear 200 that needs to be stained. The specific determining method comprises: when there is no smear 200 in the primary staining vessel 410 and no smear 200 to be stained is delivered, and/or when an idle time of the primary staining vessel 410 exceeds a preset value.

In an embodiment, the staining mechanism 40 further comprises a first staining liquid discharge system 4108. The first staining liquid discharge system 4018 is in fluid communication with the primary staining vessel 410 or the first staining liquid sealed container 4103, and when the smear preparation machine 100 senses that the first staining liquid meets a discharge requirement, or receives a first staining liquid discharge instruction issued by a user, the first staining liquid discharge system 4108 is configured to discharge the first staining liquid in the primary staining vessel 410 or the first staining liquid sealed container 4103.

Figure 9:
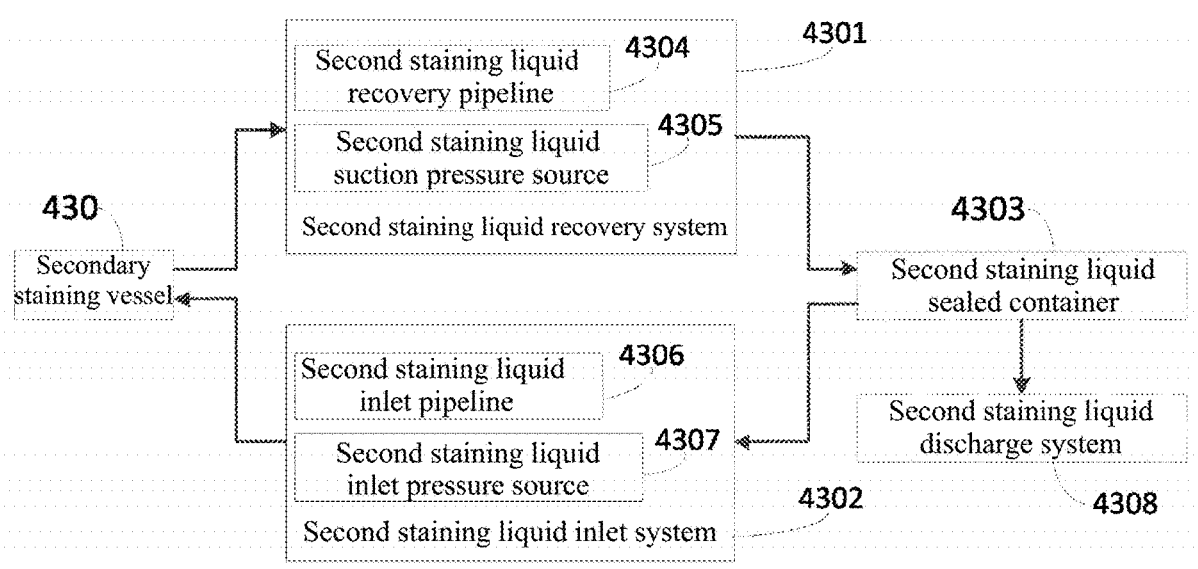
FIG. 9 is a schematic diagram of a staining mechanism in another embodiment of a smear preparation machine according to the disclosure.

Referring to the embodiment of FIG. 9, the staining mechanism 40 may also comprise a liquid path system for the secondary staining vessel 430 similar in configuration to the primary staining vessel 410. Specifically, the staining mechanism 40 further comprises a second staining liquid recovery system 4301, a second staining liquid inlet system 4302, and a second staining liquid sealed container 4303. The second staining liquid recovery system 4301 is respectively in fluid communication with the second staining liquid sealed container 4303 and the secondary staining vessel 430, and the second staining liquid recovery system 4301 is configured to recover the corresponding second staining liquid in the secondary staining vessel 430 into the second staining liquid sealed container 4303. The second staining liquid inlet system 4302 is respectively in fluid communication with the second staining liquid sealed container 4303 and the secondary staining vessel 430, and the second staining liquid inlet system 4302 is configured to discharge the second staining liquid in the second staining liquid sealed container 4303 into the secondary staining vessel 430. When the staining mechanism 40 is in a non-operating state, the second staining liquid can be accommodated and stored in the second staining liquid sealed container 4303. When the staining mechanism 40 is brought into the operating state, if the second staining liquid needs to be used to perform secondary staining on the smear 200, the second staining liquid inlet system 4302 delivers the second staining liquid into the secondary staining vessel 430 from the second staining liquid sealed container 4303; after the secondary staining is completed, the second staining liquid recovery system 4301 recovers the second staining liquid in the secondary staining vessel 430 back into the second staining liquid sealed container 4303, so that the second staining liquid can be stored more reliably, and a phenomenon that the second staining liquid is polluted by impurities or lost by volatilization can be avoided to a great extent, so as to facilitate recycling of the second staining liquid.

It can be understood that the second staining liquid recovery system 4301 may further comprise a second staining liquid recovery pipeline 4304 and a second staining liquid suction pressure source 4305. The second staining liquid recovery system 4301 is respectively in fluid communication with the secondary staining vessel 430 and the second staining liquid sealed container 4303 through the second staining liquid recovery pipeline 4304, and the second staining liquid suction pressure source 4305 is configured to suck the second staining liquid in the secondary staining vessel 430 into the second staining liquid sealed container 4303; and the second staining liquid inlet system 4302 may further comprise a second staining liquid inlet pipeline 4306 and a second staining liquid inlet pressure source 4307. The second staining liquid inlet system 4302 is respectively in fluid communication with the secondary staining vessel 430 and the second staining liquid sealed container 4303 through the second staining liquid inlet pipeline 4306, and the second staining liquid inlet pressure source 4307 discharges the second staining liquid in the second staining liquid sealed container 4303 into the secondary staining vessel 430. In an embodiment, the second staining liquid recovery pipeline 4304 and the second staining liquid inlet pipeline 4306 may be the same pipeline, and the second staining liquid inlet pressure source 4305 and the second staining liquid suction pressure source 4307 may be the same pressure source.

In an embodiment, when there is no smear 200 to be stained in the secondary staining vessel 430, or after the smear preparation machine 100 receives a second staining liquid recovery instruction issued by a user, the second staining liquid recovery system 4301 recovers the corresponding second staining liquid in the secondary staining vessel 430 into the second staining liquid sealed container 4303 for storage. When there is a smear 200 to be stained in the secondary staining vessel 430, or after the smear preparation machine 100 receives a second staining liquid inlet instruction issued by a user, the second staining liquid inlet system 4302 discharges the second staining liquid in the second staining liquid sealed container 4303 into the secondary staining vessel 430.

It should be noted that the smear preparation machine 100 may also automatically perform the action of recovering the second staining liquid. The smear preparation machine 100 may automatically control the recovery of the second staining liquid by determining whether there is a smear 200 that needs to be stained. The specific determining method comprises: when there is no smear 200 in the secondary staining vessel 430 and no smear 200 to be stained is delivered, and/or when an idle time of the secondary staining vessel 430 exceeds a preset value.

In an embodiment, the staining mechanism 40 further comprises a second staining liquid discharge system 4308. The second staining liquid discharge system 4018 is in fluid communication with the secondary staining vessel 430 or the second staining liquid sealed container 4303, and when the smear preparation machine 100 senses that the second staining liquid meets a discharge requirement, or receives a second staining liquid discharge instruction issued by a user, the second staining liquid discharge system 4308 is configured to discharge the second staining liquid in the secondary staining vessel 430 or the second staining liquid sealed container 4303.

In an embodiment, referring back to FIG. 7, the isolation vessel 420 comprises a staining improving vessel 422 for storing a buffer solution. The staining improving vessel 423 is configured to buffer and clean the smear 200 subjected to the primary staining.

In an embodiment, the isolation vessel 420 further comprises a first cleaning vessel 421 for storing a cleaning solution or a buffer solution, and the first cleaning vessel 421 is configured to clean the smear 200 subjected to the primary staining and/or the buffering and cleaning treatment by the staining improving vessel 422.

In an embodiment, the reagent vessel 41 further comprises a second cleaning vessel 440 for storing a cleaning solution or a buffer solution. The second cleaning vessel 440 is configured to clean the smear 200 subjected to the secondary staining.

To improve the convenience of operation and enhance the staining efficiency, in the embodiment of FIG. 7, the primary staining vessel 410, the staining improving vessel 422, the first cleaning vessel 421, the secondary staining vessel 430, and the second cleaning vessel 440 are sequentially arranged on the base 43 in the first direction 001 or the second direction 002. The manipulator 51 can sequentially move and perform corresponding operations corresponding to each reagent vessel 41 to successively complete the staining treatment of the smear 200 in each step. This arrangement may make the structure of the smear preparation machine 100 more compact, shorten the motion stroke of the manipulator 51 and the reagent vessel 41, and improve staining efficiency. It can be understood that the primary staining vessel 410, the staining improving vessel 422, the first cleaning vessel 421, the secondary staining vessel 430, and the second cleaning vessel 440 may be provided integrally or separately.

It should be noted that in the smear preparation machine 100 of the present application, only the sequential arrangement of the primary staining vessel 410, the staining improving vessel 422, the first cleaning vessel 421, the secondary staining vessel 430, and the second cleaning vessel 440 is defined, but the specific number of various reagent vessels 41 are not defined. Taking first cleaning vessel 421 as an example, a plurality of first cleaning vessels 421 may be continuously arranged on the base 43. Cleaning solutions or buffer solutions in the plurality of first cleaning vessels 421 may be different, or may be different in proportion, and the manipulator 51 places a smear 200 sequentially into different first cleaning vessels 421 for cleaning, so as to achieve a better cleaning effect. Certainly, the number of first cleaning vessels 421 may also be set to zero in the smear preparation machine 100, and the smear 200 is cleaned by the staining improving vessel 422, which can also achieve a buffering effect. The smear 200 is cleaned once or more with the buffer solution or the cleaning solution, depending on cleaning effects and requirements. For example, it may be that only the primary staining vessel 410, the staining improving vessel 422 and the first cleaning vessel 421 are sequentially arranged on the base 43, i.e., the smear 200 is stained only once, which may also be considered as a complete staining process, and the smear 200 which has been stained once is subjected to microscopic examination. The above embodiments belong to the scope of protection required by the smear preparation machine 100 of the present application.

Figure 10:
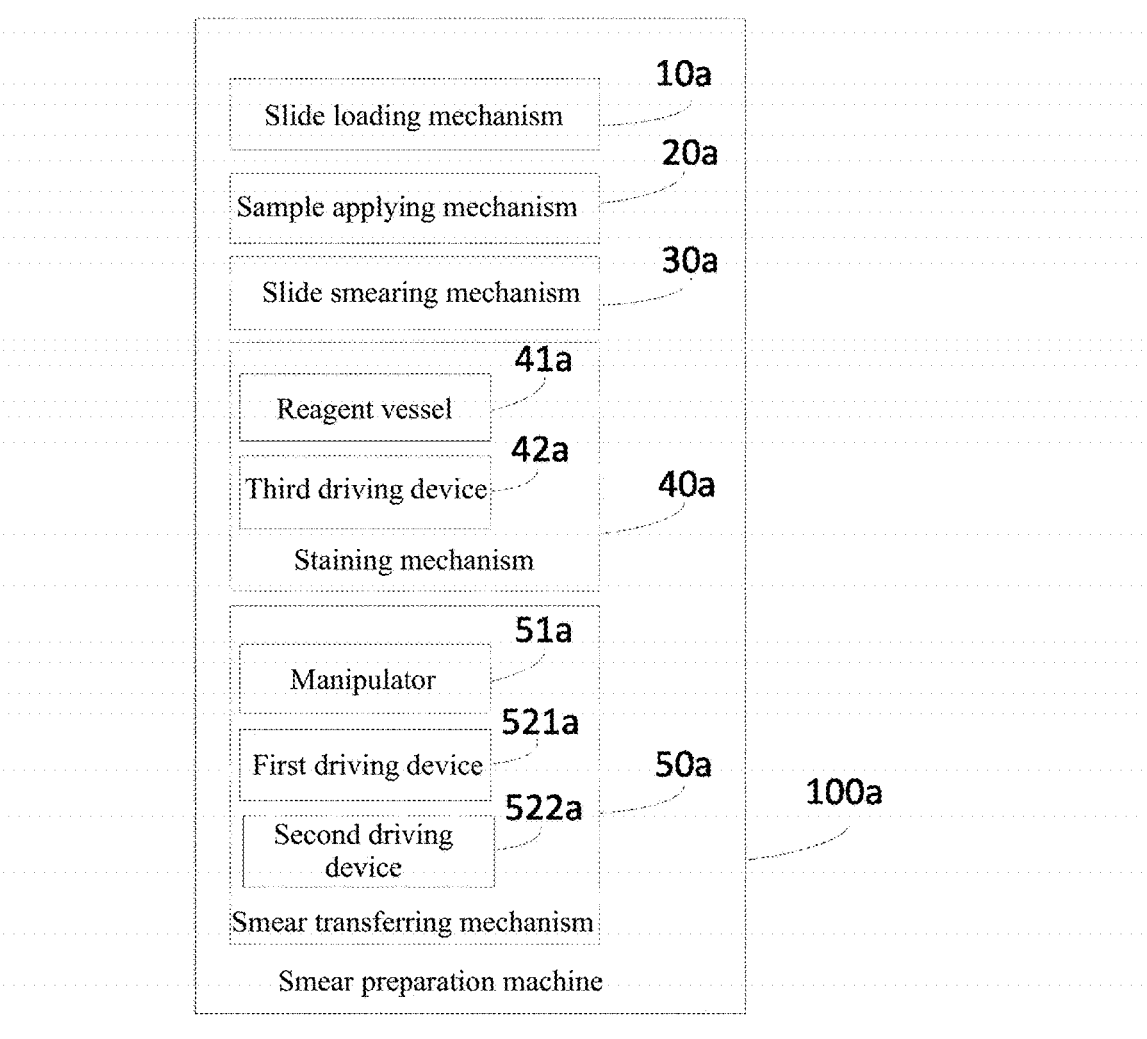
FIG. 10 is a schematic diagram of a system framework in another embodiment of a smear preparation machine according to the disclosure.

Referring to FIG. 10, the disclosure further proposes a smear preparation machine 100a, which comprises a slide loading mechanism 10a, a sample applying mechanism 20a, a slide smearing mechanism 30a, a staining mechanism 40a, and a smear transferring mechanism 50a. The smear preparation machine 100a also performs operations such as loading a slide, applying a blood sample and smearing the blood sample through the slide loading mechanism 10a, the sample applying mechanism 20a, and the slide smearing mechanism 30a, to prepare a smear 200 for microscopic examination, and the staining mechanism 40a and the smear transferring mechanism 50a cooperate to complete the staining of the smear 200 before microscopic examination. In this embodiment, the smear transferring mechanism 50a also comprises a first driving device 521a, a second driving device 522a, and a manipulator 51a, wherein the manipulator 51a is configured to extract the smear 200 and place the smear 200 into the reagent vessel 41a for staining, the first driving device 521a is configured to drive the manipulator 51a to perform reciprocating translation in a first direction, and the second driving device 522a is configured to drive the manipulator 51a to reciprocate in a second direction, the first direction being perpendicular to the second direction.

This embodiment differs from embodiments in FIGS. 1 to 9 in that in the smear preparation machine 100a in FIG. 10, the staining mechanism 40a comprises at least one reagent vessel 41a and a third driving device 42a, wherein the reagent vessel 41a is configured to store a staining reagent, the top of the reagent vessel 41a has an opening, and the third driving device 42a is configured to drive the reagent vessel to reciprocate in a single direction. The single direction here may also be interpreted as a single degree of freedom. It can be understood that when the single degree of freedom is a linear degree of freedom, the third driving device 42a drives the reagent vessel 41a to reciprocate in a linear direction, which is the same as that of the embodiments of the smear preparation machine 100 shown in FIGS. 1 to 9, and details thereof may also refer to the above embodiments. When the single degree of freedom is a rotational degree of freedom, the third driving device 42a drives the reagent vessel 41a to make a reciprocating rotary motion around a circle center axis. In this case, the reagent vessel 41a is configured to cooperate with the manipulator 51a to implement the placing and removing a smear 200, which requires the reagent vessel 41a to rotate around the circle center axis to one or several specific angles, so as to cooperate with the manipulator 51a. When the reagent vessel 41a is driven to other angles by the third driving device 42a, the reagent vessel 41a may be regarded as being in a non-cooperating state. Certainly, the reagent vessel 41a in the non-cooperating state may also accommodate a smear 200. The staining reagent in the reagent vessel 41a may be used to perform a corresponding treatment on the smear 200. After the treatment is completed, the reagent vessel 41a is driven by the third driving device 42a back to its cooperative position, and the manipulator 51a removes the smear 200. Certainly, the cooperative action between the reagent vessel 41a and the manipulator 51a is similar to that of the above embodiment. After the third driving device 42a and the first driving device 421a respectively drive the reagent vessel 41a and the manipulator 42a to move to corresponding cooperative positions (not shown in the figures), the second driving device 422a is configured to drive the manipulator 51a to move toward the reagent vessel 41a to place the smear 200 from the opening into the reagent vessel 41a for staining or remove the smear 200 from the reagent vessel 41a.

In the smear preparation machine 100a in the embodiment in FIG. 10, besides the solution that the reagent vessel 41a reciprocates in a linear direction to cooperate with the manipulator 51a so as to place and remove a smear, it also provides the solution that the reagent vessel 41a reciprocates around an axis to cooperate with the manipulator 51a so as to place and remove a smear. It can be understood that the solution in which the reagent vessel 41a performs reciprocating rotation around an axis also belongs to solutions in which the reagent vessel 41a reciprocates in a single direction. Because the reagent vessel 41a is movable, compared with a mechanism in which the manipulator moves alone, the mechanism in which the reagent vessel cooperates with the manipulator 51a to jointly implement placing and removing a smear has lower structure complexity and a simpler control solution and is easy to implement. It also achieves the beneficial effect of decomposing the three-degree-of-freedom motion of the conventional manipulator into cooperation of the reagent vessel 41a and the manipulator 51a.

Further, the implementations that, the reagent vessel 41a may also move in a horizontal plane, and a base, a sealing cover, and a plurality of reagent vessels 41a are arranged along a rotation path, and primary staining, staining improving, cleaning, secondary staining, cleaning, etc. are performed in sequence, including the implementation of liquid path design in primary staining and secondary staining, etc., are also applicable to the smear preparation machine 100a proposed in FIG. 10, so as to further improve the working efficiency of the smear preparation machine 100a and control the cost and volume of the whole machine.

Referring to FIG. 11, the disclosure further proposes a method for controlling a smear preparation machine, the method specifically comprising the following steps:

at S10, applying a blood sample onto a slide and smearing the blood sample to prepare a smear 200;

at S20, driving a manipulator 51 to extract the smear 200, and driving the manipulator 51 to translate to a placing position 501 in a second direction 002;

at S30, driving a base 43 to translate in a first direction 001 to drive at least one reagent vessel 41 to translate to a smear receiving position 401; and at S40, driving the manipulator 51 to move toward the reagent vessel 41, so as to place the smear 200 into the reagent vessel 41 for staining of the smear 200.

Corresponding to the smear preparation machine 100 above, the control method for the smear preparation machine also comprises the step of preparing a smear 200, and then the manipulator 51 is driven to extract the smear 200 to be stained. It can be understood that the manipulator 51 is configured to extract the smear 200 at the smear taking position 502. Then, the manipulator 51 is driven to translate to the placing position 501 in the second direction 002, and cooperates with the reagent vessel 41 to place in the smear 200. In this method, the reagent vessel 41 is connected to the base 43, and then translates with the base 43 in the first direction 001 to the smear receiving position 401 where the reagent vessel cooperates with the manipulator 51. It can be understood that the manipulator 51 located at the placing position 501 and the reagent vessel 41 located at the smear receiving position 401 are both located at the cooperative position 01 where they cooperate with each other. Finally, in this method, the manipulator 51 is driven to move toward the reagent vessel 41 to place the smear 200 into the reagent vessel 41 for staining of the smear 200.

In the control method for the smear preparation machine 100, the staining operation on the smear 200 is also implemented by the cooperative movement of the reagent vessel 41 and the manipulator 51. In the process of cooperative alignment of the reagent vessel 41 with the manipulator 51, it is only necessary to respectively drive the reagent vessel 41 to translate in the first direction 001 and drive the manipulator 51 to translate in the second direction 002, so the control logic is relatively simple and easy to implement. Moreover, the single-degree-of-freedom translation motion is beneficial to precision control. After the alignment between the reagent vessel 41 and the manipulator 51 is completed, the action of placing the smear 200 is completed by driving the manipulator 51 to perform a single-degree-of-freedom motion toward the reagent vessel 41, which is also a relatively simple single-degree-of-freedom control method. Therefore, this control method also uses the solution that the three-degree-of-freedom motion conventionally completed by the manipulator alone is performed by cooperation between the reagent vessel 41 and the manipulator 51. The control method for a smear preparation machine simplifies the control complexity of the manipulator, and avoids the defects of complex control logic and difficulty in control of precision caused by multi-degree-of-freedom motion coupling. The smear preparation machine 100 using this control method for a smear preparation machine obtains an improving working efficiency, reducing occupation of the internal space, and also has the effect of reducing the cost.

In an embodiment, there are a plurality of reagent vessels 41, and the plurality of reagent vessels 41 are configured to store staining reagents. The plurality of reagent vessels 41 comprise a first reagent vessel 4001 and a second reagent vessel 4002, the staining reagent in the first reagent vessel 4001 are different from the staining reagent in the second reagent vessel 4002, and the smear 200 is treated in the first reagent vessel 4001 and then treated in the second reagent vessel 4002. Referring to FIG. 12, the method further comprises:

at S50, driving the manipulator 51 located at the placing position 501 to move toward the first reagent vessel 4001 to remove the smear 200 subjected to first treatment from the first reagent vessel 4001;

at S60, driving the base 43 to translate in the first direction 001 and/or driving the manipulator 51 to translate in the second direction 002, so that the second reagent vessel 4002 is located at the smear receiving position 401, and the manipulator 51 is located at the placing position 501 corresponding to the second reagent vessel 4002; and at S70, driving the manipulator 51 to move toward the second reagent vessel 4002 to place the smear 200 into the second reagent vessel 4002 for second treatment.

It can be understood that, corresponding to the above embodiments, the reagent vessel 41 may comprise a primary staining vessel 410, a staining improving vessel 422, a first cleaning vessel 421, a secondary staining vessel 430, and a second cleaning vessel 440, so as to perform treatment operations such as primary staining, staining improving, cleaning, secondary staining and cleaning on the smear 200 in sequence. The first reagent vessel 4001 may be a primary staining vessel 410. In this case, the smear 200 after primary staining may be removed from the first reagent vessel 4001 by using this method, and then the second reagent vessel 4002 and the manipulator 51 are located at cooperative positions 01 corresponding to each other by the cooperative movement of the base 43 and the manipulator 51. It can be understood that when the manipulator 51 removes the smear 200 from the first reagent vessel 4001, the manipulator 51 is located at the placing position 501 corresponding to the first reagent vessel 4001, and the first reagent vessel 4001 is also located at the smear receiving position 401 corresponding to the manipulator 51. In this case, the manipulator 51 may be driven to translate in the second direction 002, so that the manipulator 51 and the second reagent vessel 4002 are located at the cooperative positions 01 corresponding to each other; it is also possible to drive the base 43 to translate in the first direction 001, so that the manipulator 51 and the second reagent vessel 4002 are located at the cooperative positions 01 corresponding to each other; or the manipulator 51 and the base 43 are respectively driven to translate, and the manipulator 51 and the second reagent vessel 4002 are located at the cooperative positions 01 corresponding to each other. The specific driving method may be determined according to the relative position of the manipulator 51 at the placing position 501 corresponding to the first reagent vessel 4001 and the second reagent vessel 4002. Then, the manipulator 51 is driven to move toward the second reagent vessel 4002 to place the smear 200 into the second reagent vessel 4002 for second treatment. In this case, the second reagent vessel 4002 may be a staining improving vessel 422 or a first cleaning vessel 421, and the second treatment is staining improving or cleaning treatment.

Certainly, when the first reagent vessel 4001 is a staining improving vessel 422, the second reagent vessel 4002 may be a first cleaning vessel 421 or a secondary staining vessel 430; when the first reagent vessel 4001 is a first cleaning vessel 421, the second reagent vessel 4002 may also be a secondary staining vessel 430; and when the first reagent vessel 4001 is a secondary staining vessel 430, the second reagent vessel 4002 may be a second cleaning vessel 440. In this embodiment, the control method for a smear preparation machine provides a solution in which the smear 200 is removed from the first reagent vessel 4001 by the manipulator 51, and then the smear 200 is placed into the second reagent vessel 4002 quickly through the cooperative translation motion of the manipulator 51 and the base 43. Because the manipulator 51 and the base 43 are moved separately, the translation of the manipulator 51 and the translation of the base 43 can be controlled simultaneously and separately. On the premise of simplifying the control logic, the fast transfer treatment operation of the smear 200 is implemented, and the working efficiency of the smear preparation machine 100 is improved.

Figure 13:
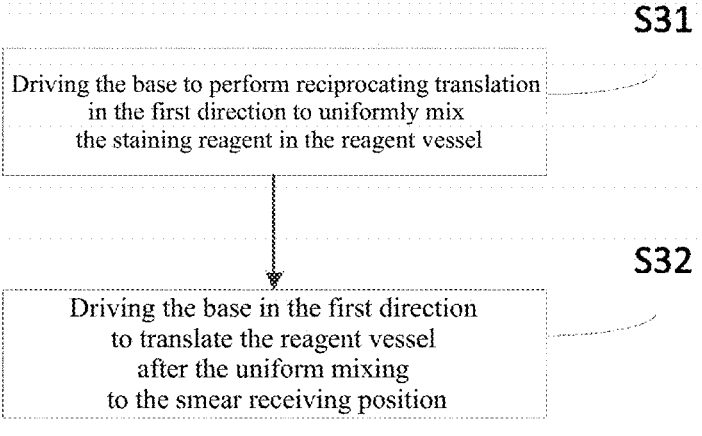
FIG. 13 is a flowchart of sub-steps of step S30 in the method for controlling a smear preparation machine according to the disclosure.

In an embodiment, referring to FIG. 13, FIG. 13 is a flowchart of sub-steps of step S30 in FIG. 11. In this embodiment, the reagent vessel 41 is configured to store a staining reagent, and the step S30 of the driving the reagent vessel 41 to translate to the smear receiving position 401 in the first direction 001 further comprise:

at S31, driving a base 43 to perform reciprocating translation in a first direction 001 to uniformly mix the staining reagent in the reagent vessel 41; and at S32, driving the base 43 in the first direction 001 to translate the reagent vessel 41 after uniform mixing to the smear receiving position 401.

Corresponding to the above device embodiment, according to that staining reagents stored in different reagent vessels 41 are different, it is necessary to prepare a mixed reagent of a stain and a buffer solution according to a certain proportion, or to perform solution addition after the staining reagent is consumed and volatilized. If the reagent vessel 41 is in a standing state, different components or new and old liquids in the reagent vessel 41 are prone to delamination. Therefore, in this method, the first driving system 42 can be used to drive the reagent vessel 41 to perform reciprocating translation in the first direction 001 to uniformly mix the staining reagent in the reagent vessel 41, and then the first driving system 42 drives the reagent vessel 41 to move to the smear receiving position 401 to receive the smear 200 that is placed in.

It should be noted that the specific implementations of the control method for a smear preparation machine of the present application may be further explained corresponding to the device embodiments in FIGS. 1 to 10.

The features mentioned above in the description, claims and accompanying drawings may be combined with each other arbitrarily as long as they are meaningful within the scope of the disclosure. The advantages and features described for the smear preparation machine 100 are applicable to the control method for the smear preparation machine in a corresponding manner, and vice versa.

The above implementations do not limit the scope of protection of the technical solution. Any modification, equivalent replacement, improvement, etc. made within the spirit and principle of the above implementations shall fall within the scope of protection of the technical solution.

The invention claimed is:

1. A smear preparation machine, comprising:

a slide loading mechanism configured to load a slide;

a sample applying mechanism configured to apply a blood sample onto the slide;

a slide smearing mechanism configured to smear the blood sample on the slide to prepare a smear;

a staining mechanism comprising at least one reagent vessel and a first driving system, wherein the reagent vessel is configured to store a staining reagent and has an opening at its top, and the first driving system is configured to drive the reagent vessel to perform reciprocating linear motion in a first direction; and a smear transferring mechanism comprising a manipulator and a second driving system, wherein the manipulator is configured to extract the smear and place the smear into the reagent vessel for staining, the second driving system is configured to drive the manipulator to perform reciprocating translation in a second direction, and the second direction is perpendicular to the first direction;

wherein the second driving system is further configured to drive the manipulator to move toward the opening of the reagent vessel to place the smear through the opening into the reagent vessel for staining or remove the smear from the reagent vessel through the opening, after the first driving system and the second driving system respectively drive the reagent vessel and the manipulator to translate to corresponding cooperative positions, and the second driving system is further configured to drive the manipulator to translate among a plurality of cooperative positions in the second direction, to place or remove the corresponding smear at the plurality of cooperative positions.

2. The smear preparation machine of claim 1, wherein the second driving system comprises a first driving device and a second driving device, wherein the first driving device is configured to drive the manipulator to perform reciprocating translation in the second direction, and the second driving device is configured to drive the manipulator to reciprocate in a third direction perpendicular to the second direction, so that the manipulator is moved toward the opening of the reagent vessel to place the smear into the reagent vessel for staining or remove the smear from the reagent vessel.

3. The smear preparation machine of claim 1, wherein the staining mechanism is provided with a smear receiving position and a storage position corresponding to the reagent vessel, wherein the smear receiving position corresponds to the cooperative positions of the reagent vessel and the manipulator, the first driving system is further configured to drive the reagent vessel to perform linear motion to move between the storage position and the smear receiving position, and the manipulator is further configured to place the smear into the reagent vessel located at the smear receiving position, or remove the smear from the reagent vessel located at the smear receiving position.

4. The smear preparation machine of claim 3, wherein the first driving system is further configured to drive the reagent vessel to perform reciprocating linear motion in a first horizontal plane to move between the storage position and the smear receiving position.

5. The smear preparation machine of claim 3, wherein the first driving system is further configured to drive the reagent vessel to perform reciprocating linear motion in the first direction so as to uniformly mix the staining reagent in the reagent vessel, and then drive the reagent vessel to move to the smear receiving position.

6. The smear preparation machine of claim 3, wherein the staining mechanism further comprises a base connected between the reagent vessel and the first driving system, the at least one reagent vessel comprises a plurality of reagent vessels, the staining mechanism is provided with at least one smear receiving position corresponding to each reagent vessel, and the manipulator is further configured to place or remove a smear into or from each reagent vessel at the smear receiving position corresponding to said reagent vessel.

7. The smear preparation machine of claim 6, wherein the plurality of reagent vessels are sequentially arranged on the base in the first direction or the second direction.

8. The smear preparation machine of claim 1, wherein each reagent vessel comprises at least one placing component, and each placing component is configured to provide an insertion area into which a smear is inserted, so that the smear is capable of being immersed in the staining reagent stored in the reagent vessel when the smear is inserted into the insertion area, to perform corresponding treatment.

9. The smear preparation machine of claim 1, wherein each reagent vessel comprises a plurality of placing components, and each placing component is configured to provide an insertion area into which a smear is inserted, so that the smear is capable of being immersed in the staining liquid stored in the reagent vessel when the smear is inserted into the insertion area, to perform corresponding treatment; and when the plurality of reagent vessels are arranged on the base in the first direction, the plurality of placing components in each reagent vessel are arranged in the second direction; or when the plurality of reagent vessels are arranged on the base in the second direction, and the plurality of placing components in each reagent vessel are arranged in the first direction.

10. The smear preparation machine of claim 3, wherein the staining mechanism is provided with a fixed cover plate, which is configured to cover the opening of the reagent vessel located at the storage position.

11. The smear preparation machine of claim 2, wherein a moving path of the manipulator is provided with a smear taking position and a plurality of placing positions corresponding to the manipulator, the plurality of placing positions correspond to the plurality of cooperative positions of the manipulator, the first driving device is further configured to drive the manipulator to move between the smear taking position and the plurality of placing positions, and the manipulator is further configured to extract the smear at the smear taking position, and to place the smear into the reagent vessel or remove the smear from the reagent vessel at the plurality of placing positions.

12. The smear preparation machine of claim 11, wherein the first driving device is further configured to drive the manipulator to translate in a second horizontal plane to move between the smear taking position and the plurality of placing positions, and the second driving device is further configured to drive the manipulator to perform reciprocating translation in a vertical direction so as to place the smear into the reagent vessel or remove the smear from the reagent vessel.

13. The smear preparation machine of claim 1, wherein the at least one reagent vessel comprises a primary staining vessel and an isolation vessel, the primary staining vessel is configured to store a first staining liquid for primary staining of the smear, the first staining liquid is a mixture of a first biological dye and a second biological dye, the first biological dye is capable of staining acidophilic substances in the blood sample, and the second biological dye is capable of staining alkalophilic substances in the blood sample, and the isolation vessel is configured to store a reagent for treating the blood sample after the primary staining and before a secondary staining.

14. The smear preparation machine of claim 13, wherein the at least one reagent vessel further comprises a secondary staining vessel, which is configured to store a second staining liquid for the secondary staining of the smear, the second staining liquid is a mixture of a third biological dye and a buffer solution, and the third biological dye is capable of staining acidophilic substances or alkalophilic substances in the blood sample.

15. The smear preparation machine of claim 13, wherein the staining mechanism further comprises a first staining liquid recovery system, a first staining liquid inlet system, and a first staining liquid sealed container, and the first staining liquid recovery system is respectively in fluid communication with the first staining liquid sealed container and the primary staining vessel, so as to recover the corresponding first staining liquid in the primary staining vessel into the first staining liquid sealed container; and the first staining liquid inlet system is respectively in fluid communication with the first staining liquid sealed container and the primary staining vessel, so as to discharge the first staining liquid in the first staining liquid sealed container into the primary staining vessel.

16. The smear preparation machine of claim 15, wherein the staining mechanism further comprises a first staining liquid discharge system, which is in fluid communication with the primary staining vessel or the first staining liquid sealed container, so as to discharge system discharge the first staining liquid in the primary staining vessel or in the first staining liquid sealed container.

17. The smear preparation machine of claim 14, wherein the isolation vessel comprises a staining improving vessel for storing a buffer solution, and the staining improving vessel is configured to buffer and clean the smear subjected to the primary staining; or wherein the isolation vessel further comprises a first cleaning vessel for storing a cleaning solution or a buffer solution, and the first cleaning vessel is configured to clean the smear subjected to the primary staining and/or subjected to the treatment by the staining improving vessel; or wherein the at least one reagent vessel further comprises a second cleaning vessel for storing a cleaning solution or a buffer solution, and the second cleaning vessel is configured to clean the smear subjected to the secondary staining.

18. A smear preparation machine, comprising:

a slide loading mechanism configured to load a slide;

a sample applying mechanism configured to apply a blood sample onto the slide;

a slide smearing mechanism configured to smear the blood sample on the slide to make a smear;

a staining mechanism, comprising at least one reagent vessel and a first driving system, wherein the reagent vessel is configured to store a staining reagent and has an opening at its top, and the first driving system is configured to drive the reagent vessel to linearly move in a single direction; and a smear transferring mechanism comprising a manipulator and a second driving system, wherein the manipulator is configured to extract the smear and place the smear into the reagent vessel for staining, or remove the smear from the reagent vessel, and the second driving system is configured to drive the manipulator to translate among a plurality of cooperative positions in a second direction different from the single direction, to place or remove the corresponding smear at the plurality of cooperative positions.

* * * * *